(12) United States Patent
Fujishima et al.

(10) Patent No.: US 10,158,624 B2
(45) Date of Patent: Dec. 18, 2018

(54) SYSTEM, DEVICE AND METHOD FOR MONITORING NETWORK

(71) Applicant: FUJITSU LIMITED, Kawasaki-shi, Kanagawa (JP)

(72) Inventors: Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 15/363,142

(22) Filed: Nov. 29, 2016

(65) Prior Publication Data
US 2017/0155643 A1 Jun. 1, 2017

(30) Foreign Application Priority Data
Nov. 30, 2015 (JP) .................................. 2015-232726

(51) Int. Cl.
*H04L 9/00* (2006.01)
*H04L 29/06* (2006.01)

(52) U.S. Cl.
CPC .............................. *H04L 63/0823* (2013.01)

(58) Field of Classification Search
CPC ................................................. H04L 63/0823
See application file for complete search history.

(56) References Cited

U.S. PATENT DOCUMENTS

| 8,458,323 | B1* | 6/2013 | Baader, II | H04L 41/5074 709/223 |
| 8,595,058 | B2* | 11/2013 | Fordyce, III | G06Q 20/10 705/14.1 |
| 8,925,052 | B2* | 12/2014 | Deagon | G06F 21/41 709/227 |
| 9,319,407 | B1* | 4/2016 | Mauer | H04L 63/0884 |
| 9,444,830 | B2* | 9/2016 | Kim | H04L 63/1416 |
| 9,967,260 | B1* | 5/2018 | Gabriel | H04L 63/102 |
| 2010/0128298 | A1 | 5/2010 | Matsugashita | |

FOREIGN PATENT DOCUMENTS

| JP | 2010-130349 | 6/2010 |
| JP | 2012-221274 | 11/2012 |

\* cited by examiner

*Primary Examiner* — Beemnet W Dada
(74) *Attorney, Agent, or Firm* — Oblon, McClelland, Maier & Neustadt, L.L.P.

(57) ABSTRACT

A system includes first circuitry in a first computing device configured to issue a credential, second circuitry in a second computing device configured to perform an operation corresponding to content at a third computing device based on the credential, third circuitry in the third computing device configured to receive a request to perform the operation corresponding to the content from the second computing device, and fourth circuitry in a fourth computing device configured to monitor communication between the first computing device, the second computing device and the third computing device.

20 Claims, 24 Drawing Sheets

FIG. 7

| DATE AND TIME | TRANSMISSION SOURCE IP ADDRESS | TRANSMISSION SOURCE PORT NUMBER | DESTINATION IP ADDRESS | DESTINATION PORT NUMBER | CLIENT REALM NAME AND ACCOUNT NAME | SERVER REALM NAME AND SERVER NAME | SERVICE TICKET |
|---|---|---|---|---|---|---|---|
| $T_1$ | x.x.x.15 | 88 | x.x.x.10 | $P_1$ | domainA¥userA | domainA¥serverA | xxxx |
| ... | ... | ... | ... | ... | ... | ... | ... |

FIG. 12

| DATE AND TIME | TRANSMISSION SOURCE IP ADDRESS | TRANSMISSION SOURCE PORT NUMBER | DESTINATION IP ADDRESS | DESTINATION PORT NUMBER | CONNECTION ID | CLIENT REALM NAME AND ACCOUNT NAME | SERVER REALM NAME AND SERVER NAME |
|---|---|---|---|---|---|---|---|
| $T_2$ | x.x.x.10 | $P_1$ | x.x.x.30 | $P_2$ | $C_1$ | domainA¥userA | domainA¥serverA |
| ... | ... | ... | ... | ... | ... | ... | ... |

FIG. 14

| CONNECTION ID | TRANSMISSION SOURCE IP ADDRESS | TRANSMISSION SOURCE PORT NUMBER | DESTINATION IP ADDRESS | DESTINATION PORT NUMBER |
|---|---|---|---|---|
| $C_1$ | x.x.x.10 | $P_1$ | x.x.x.30 | $P_2$ |
| ⋮ | ⋮ | ⋮ | ⋮ | ⋮ |

FIG. 19

| DATE AND TIME | TRANSMISSION SOURCE IP ADDRESS | TRANSMISSION SOURCE PORT NUMBER | DESTINATION IP ADDRESS | DESTINATION PORT NUMBER | CONNECTION ID | COMMAND NAME + OPTION | ATTRIBUTE DATA ||| 
|---|---|---|---|---|---|---|---|---|---|
| | | | | | | | CLIENT REALM NAME AND ACCOUNT NAME | SERVER REALM NAME AND SERVER NAME | PATH OR ACCOUNT NAME |
| $T_3$ | x.x.x.10 | $P_1$ | x.x.x.30 | $P_2$ | $C_1$ | FILE READ | domainA¥userA | domainA¥serverA | c:¥fileA |
| $T_4$ | x.x.x.13 | $P_3$ | x.x.x.25 | $P_4$ | $C_2$ | USER REGISTRATION | domainB¥userB | domainB¥serverB | newuserA |
| ... | ... | ... | ... | ... | ... | ... | ... | ... | |

SYSTEM, DEVICE AND METHOD FOR MONITORING NETWORK

CROSS-REFERENCE TO RELATED APPLICATION

This application is based upon and claims the benefit of priority of the prior Japanese Patent Application No. 2015-232726, filed on Nov. 30, 2015, the entire contents of which are incorporated herein by reference.

FIELD

The embodiments discussed herein are related to a logging technology for a remote operation in a network.

BACKGROUND

After performing user authentication by using credentials, a server computer to follow a remote operation protocol of a network receives a remote operation from a user. An account name and a password, specified by the user, correspond to the credentials, for example.

In a recent information processing system, in order to manage accounts in an integrated fashion, user authentication in a server computer is performed by using service tickets issued by a ticket issuing system, instead of sending, to a network, an account name and a password in plain text, in some cases. This case is based on the premise that pre-authentication utilizing the account name and the password is performed in the ticket issuing system.

If such an information processing system is subjected to a cyber attack and an account name and a password are plagiarized, an attacker acquires a service ticket and becomes able to perform an illegal remote operation on the server computer.

In addition, a device, which captures, for various purposes, communication data in an information processing system and which monitors behaviors within the system, is known.

Related technologies are disclosed in, for example, Japanese Laid-open Patent Publication No. 2010-130349, Japanese Laid-open Patent Publication No. 2012-221274, and so forth.

SUMMARY

According to an aspect of the invention, a system includes first circuitry in a first computing device configured to issue a credential, second circuitry in a second computing device configured to perform an operation corresponding to content at a third computing device based on the credential, third circuitry in the third computing device configured to receive a request to perform the operation corresponding to the content from the second computing device, and fourth circuitry in a fourth computing device configured to monitor communication between the first computing device, the second computing device and the third computing device. The first circuitry is configured to receive, from the second computing device, a first request including account information, the first request requesting issuance of the credential, generate the credential in a case where first authentication for the first request is successful, and transmit, to the second computing device, a first response including the credential and the account information. The second circuitry is configured to transmit, to the third computing device, a second request including the credential and not including the account information, in a case of receiving the first response from the first computing device, the second request requesting second authentication related to performing the operation corresponding to the content at the third computing device, and transmit, to the third computing device, a third request requesting to perform the operation corresponding to the content, in a case of receiving, from the third computing device, a second response indicating a success of the second authentication. The third circuitry is configured to receive the second request, transmit, to the second computing device, the second response notifying success of the second authentication in a case where the second authentication for the second request succeeds, perform the operation corresponding to the content in a case of receiving the third request, and transmit, to the second computing device, a third response including a result of the operation corresponding to the content. The fourth circuitry is configured to acquire first information corresponding to the first response, second information corresponding to the second request, and third information corresponding to the third request, generate a first log record related to issuance of the credential based on the first information, generate a second log record related to the second authentication based on the second information and the first log record, and generate a third log record related to the operation corresponding to the content based on the third information and the second log record.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a configuration of an issuance log;
FIG. 12 is a diagram illustrating an example of a configuration of an authentication log;
FIG. 14 is a diagram illustrating an example of a configuration of a connection table.

FIG. 19 is a diagram illustrating an example of a configuration of an operation log;

DESCRIPTION OF EMBODIMENTS

In one aspect, an object of the technology disclosed in embodiments is to identify an account that performs a remote operation based on a credential issued by a credential issuing device.

First Embodiment

Figure 1:
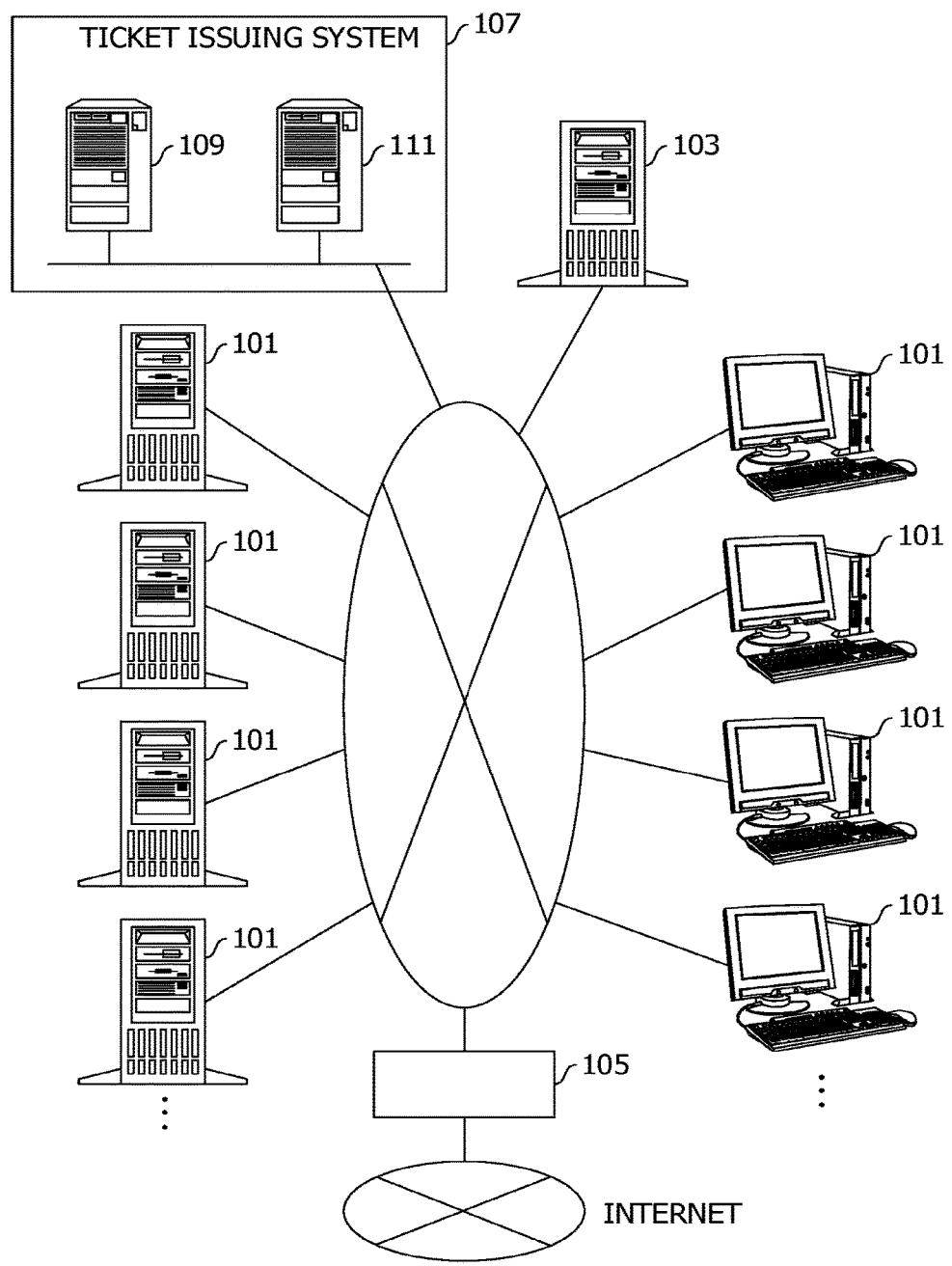
FIG. 1 is a diagram illustrating an example of an information processing system.

FIG. 1 illustrates an example of an information processing system. Computers 101 are connected via a network (for example, a local area network (LAN)). The network is connected to the Internet via a firewall 105. It is assumed that the information processing system is based on, for example, an intranet. Each of the computers 101 is, for example, a server computer or a client computer. Functions of the server computer are arbitrary. The server computer may be, for example, a domain management server, a Web server, a file server, a Windows (registered trademark) server, a Samba server, or the like.

Each of the client computers uses services based on the individual server computers, in some cases. Each of the client computers uses dada held by each of the server computers, in some cases. In addition, some of the server computers collaborate with one another in some cases. The client computers share data in some cases. One of the client computers uses a service based on another one of the client computers in some cases.

In other words, it is assumed that, under a predetermined condition, the computers 101 arbitrarily perform remote operations on one another in some cases. Therefore, control based on a server message block (SMB) is performed between the computers 101. The SMB is an example of a protocol of an application layer, which provides functions of a remote operation. As the protocol of an application layer, which provides functions of a remote operation, control based on a distributed computing environment/remote procedure calls (DCE/RPC) may be further performed.

In the present embodiment, a user is authenticated by using a Kerberos authentication method. Kerberos authentication is a network authentication method utilizing a common key encryption method. The Kerberos authentication provides a mechanism of single sign-on, in which one-time acquisition of user authentication makes services available. In a sequence illustrated below, a client computer and a server computer each decrypt a ticket by using one's own common key and each acquire a session key, thereby performing mutual authentication. In addition, in the Kerberos authentication, time synchronization processing for avoiding spoofing and encryption processing for concealing data are performed, too.

In accordance with the Kerberos authentication method, the ticket issuing system 107 manages accounts and access rights of respective users in an integrated fashion. In addition, the ticket issuing system 107 holds common keys of the respective client computers and common keys of the respective server computers. By using these common keys, the ticket issuing system 107 confirms the identity of each of the client computers and the server computers. The ticket issuing system 107 is called a key distribution center (KDC) or a domain controller, in some cases. The ticket issuing system 107 includes an authentication server 109 and a ticket issuing server 111. The authentication server 109 and the ticket issuing server 111 may be provided in an integrated device.

The authentication server 109 performs user authentication in the Kerberos authentication method. The authentication server 109 is called an authentication server (AS) in some cases.

The ticket issuing server 111 issues a service ticket used by one of the client computers to use one of the server computers. The service ticket includes an ID of the corresponding one of the client computers, a time stamp, and a term of validity. The ticket issuing server 111 is called a ticket granting server (TGS) in some cases.

The service ticket in the present embodiment is an example of a credential. Likewise, the ticket issuing server 111 is an example of the credential issuing device. In addition, likewise, the ticket issuing system 107 is an example of a credential issuing system.

Note that each of the client computers and the server computers is called a principal in some cases. In addition, a group of client computers and server computers, to which the same authentication policy is applied, is called a realm in some cases. In this example, it is assumed that the realm is identical to a domain.

A monitoring device 103 is connected to a network via, for example, a switch or network tap compatible with port mirroring. The monitoring device 103 captures packets flowing through the network and analyzes the packets, thereby generating a log of a remote operation with which an account name is associated.

Figure 2:
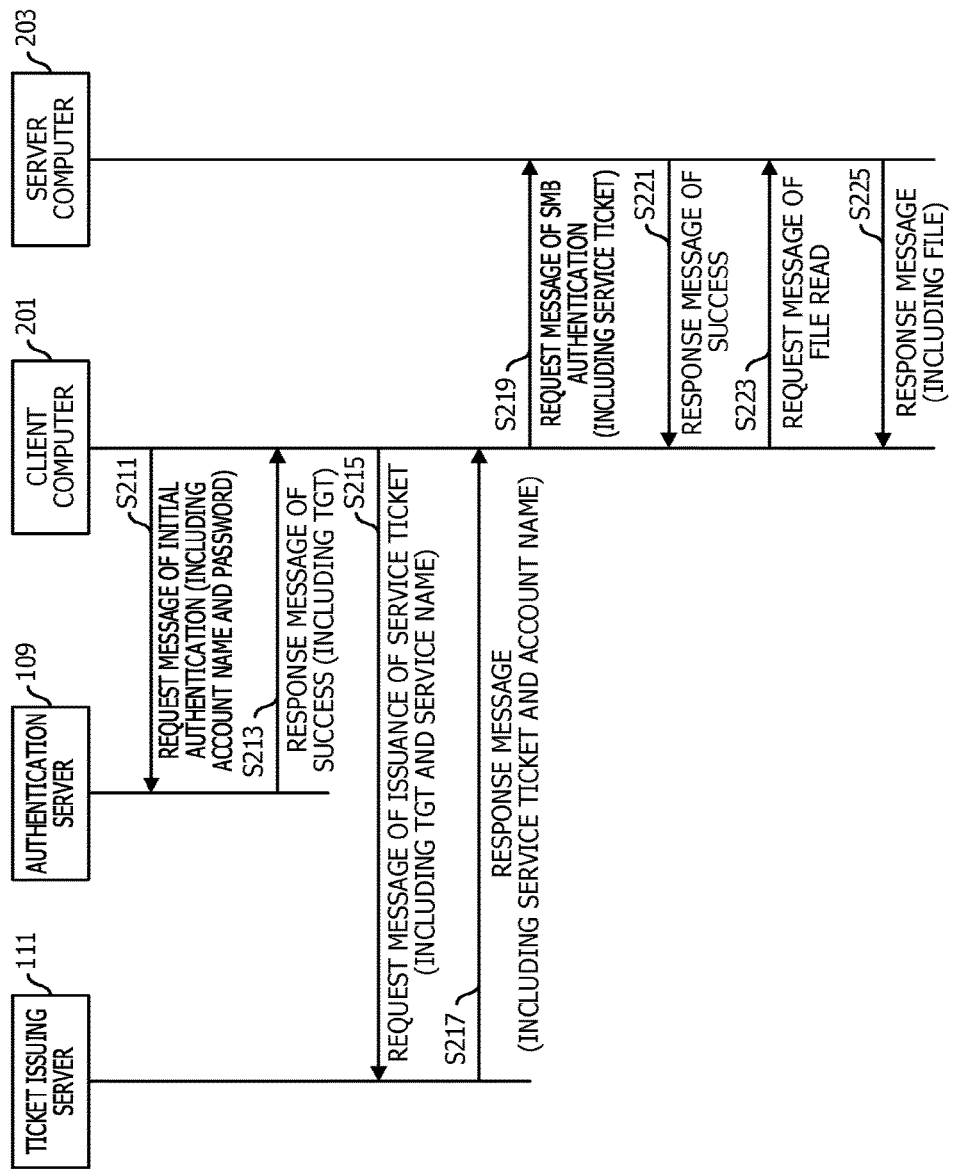
FIG. 2 is a diagram illustrating an example of a sequence.

FIG. 2 illustrates an example of a sequence. In this example, it is assumed that a client computer 201 accesses a server computer 203 and uses a service of the server computer 203.

The client computer 201 sends, to the authentication server 109, a request message of user authentication (hereinafter, called initial authentication) in the Kerberos authentication method (S211). The relevant request message includes an account name and a password, assigned to a user of the client computer 201.

Based on the account name and the password included in the relevant request message, the authentication server 109 performs the initial authentication. If the initial authentication succeeds, the authentication server 109 generates a ticket-granting ticket (TGT) and sends, to the client computer 201, a response message of a success, which includes the TGT (S213). The TGT is a ticket for permitting a service ticket to be issued.

The client computer 201 stores the TGT included in the response message of a success. The client computer 201 sends, to the ticket issuing server 111, a request message of issuance of the service ticket for using the server computer 203 (S215). The relevant request message includes the TGT and a service name of the server computer 203.

The ticket issuing server 111 verifies the TGT included in the request message of issuance of the service ticket. Specifically, the ticket issuing server 111 confirms the time stamp and the term of validity of the TGT and further confirms that it is a user who has an access right for the server computer 203. If the verification succeeds, the service ticket used by the user authenticated in S211 to utilize the server computer 203 is generated. In addition, the ticket issuing server 111 sends, to the client computer 201, a response message including the service ticket (S217). The relevant response message includes the account name used for the initial authentication.

Upon receiving the relevant response message, the client computer 201 sends, to the server computer 203, a request message of SMB authentication (S219). The relevant request message includes the service ticket.

Based on the service ticket, the server computer 203 performs user authentication (hereinafter, called SMB authentication) in the SMB. In a case where the service ticket is valid, the SMB authentication succeeds. If the SMB authentication succeeds, the server computer 203 sends a response message of a success to the client computer 201 (S221).

If the response message of a success is sent, a preparation for a remote operation to be performed by the client computer 201 is completed. In this example, the client computer 201 sends, to the server computer 203, a request message of file read (S223).

In accordance with the relevant request message, the server computer 203 sends, to the client computer 201, a response message including a file (S225). The file read illustrated in FIG. 2 is an example of a remote operation, and another remote operation is performed in some cases. On the premise of such a sequence, the monitoring device 103 analyzes a packet corresponding to the above-mentioned message.

Figure 3:
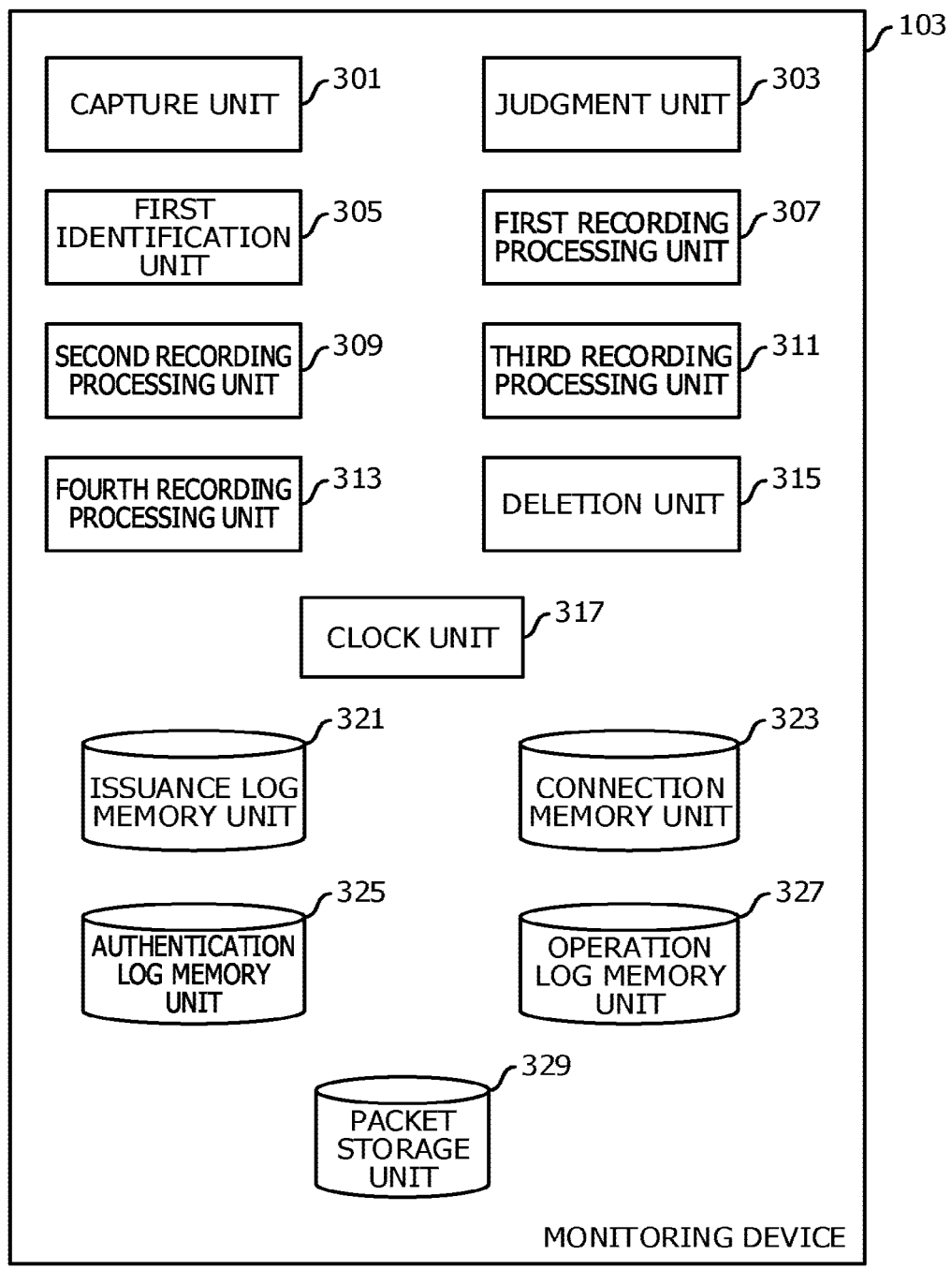
FIG. 3 is a diagram illustrating an example of a module configuration of a monitoring device.

Next, an operation of the monitoring device 103 will be described. FIG. 3 illustrates an example of a module configuration of the monitoring device 103. The monitoring device 103 includes a capture unit 301, a judgment unit 303, a first identification unit 305, a first recording processing unit 307, a second recording processing unit 309, a third recording processing unit 311, a fourth recording processing unit 313, a deletion unit 315, a clock unit 317, an issuance log memory unit 321, a connection memory unit 323, an authentication log memory unit 325, an operation log memory unit 327, and a packet storage unit 329.

The capture unit 301 captures packets flowing through the network. The judgment unit 303 judges the type of a packet. The first identification unit 305 performs connection identification processing. The first recording processing unit 307 performs first recording processing. In the first recording processing, data related to credential issuance is recorded in an issuance log. The second recording processing unit 309 performs second recording processing. In the second recording processing, data related to the SMB authentication is recorded in an authentication log. In the present embodiment, second recording processing (A) is performed. In an embodiment to be described later, second recording processing (B) is performed. The third recording processing unit 311 performs third recording processing. In the third recording processing, data related to a remote file access is recorded in an operation log. The fourth recording processing unit 313 performs fourth recording processing. In the fourth recording processing, data related to remote operations other than the remote file access are recorded in the operation log. The deletion unit 315 deletes data of the issuance log. The clock unit 317 measures a date and time.

The issuance log memory unit 321 memorizes the issuance log. The connection memory unit 323 memorizes a connection table. The authentication log memory unit 325 memorizes the authentication log. The operation log memory unit 327 memorizes the operation log. The packet storage unit 329 stores therein the captured packets. The individual logs and the table will be described later.

The capture unit 301, the judgment unit 303, the first identification unit 305, the first recording processing unit 307, the second recording processing unit 309, the third recording processing unit 311, the fourth recording processing unit 313, the deletion unit 315, and the clock unit 317, described above, are realized by using hardware resources (in, for example, FIG. 24) and a program to cause a processor to perform processing described later.

Figure 24:
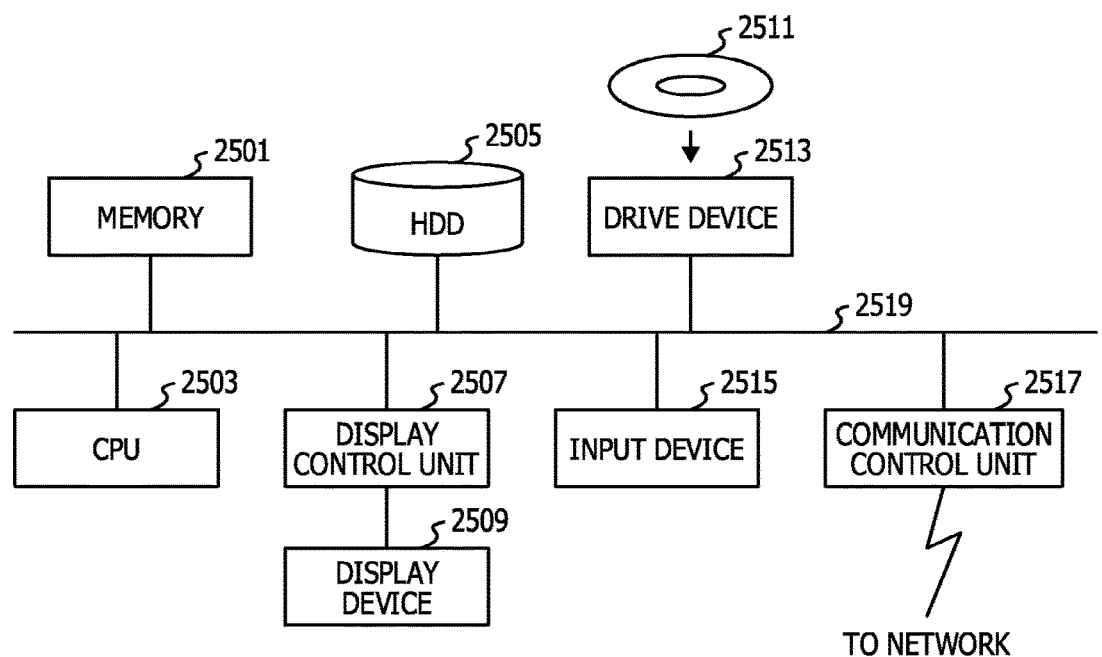
FIG. 24 is a functional block diagram of a computer.

The issuance log memory unit 321, the connection memory unit 323, the authentication log memory unit 325, the operation log memory unit 327, and the packet storage unit 329, described above, are realized by using hardware resources (in, for example, FIG. 24).

Figure 4:
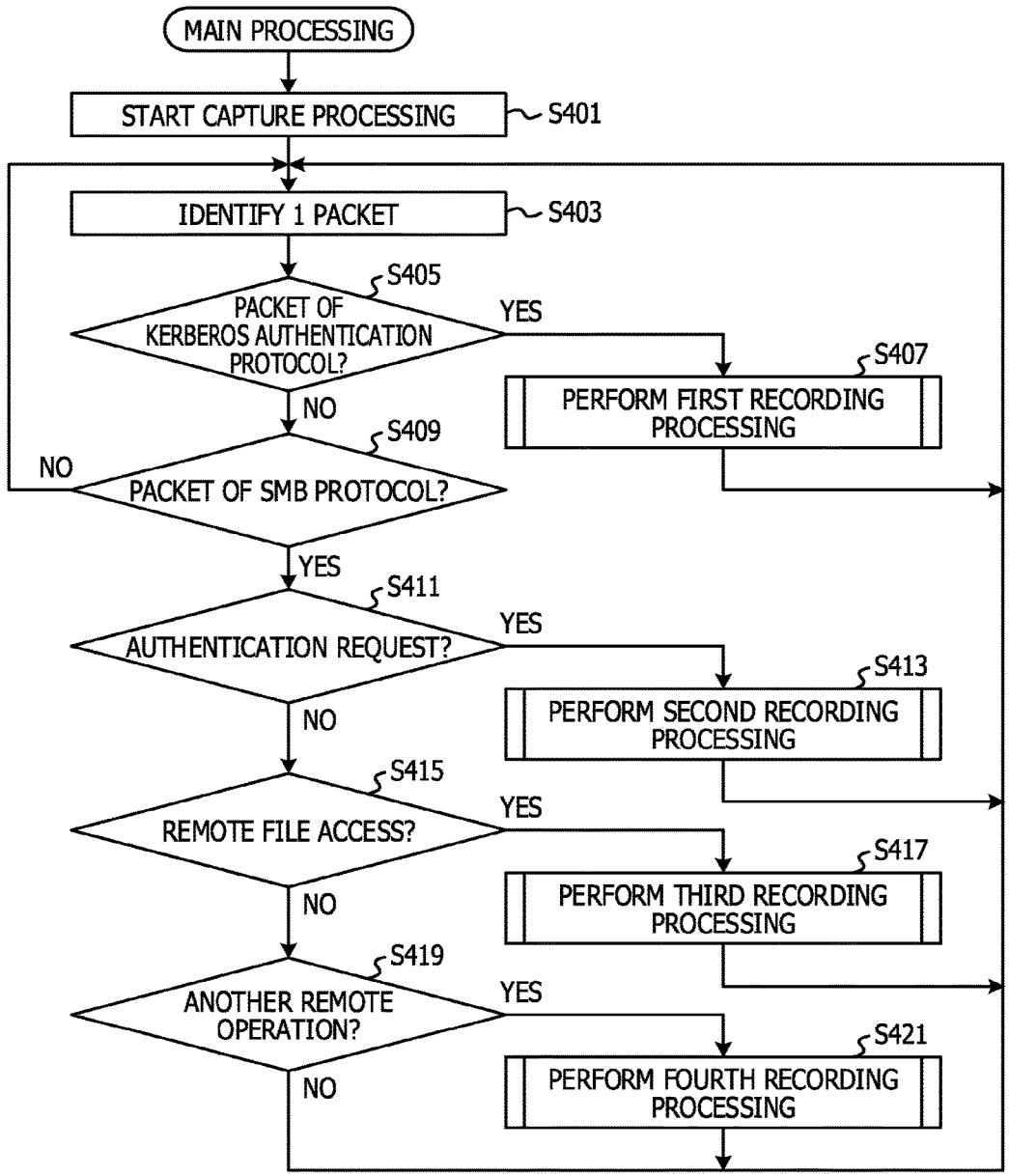
FIG. 4 is a diagram illustrating a main processing flow.

Next, processing in the monitoring device 103 will be described. FIG. 4 illustrates a main processing flow. The capture unit 301 starts capture processing (S401). In the capture processing, the capture unit 301 captures packets flowing through the network, via a switch or network tap, which is compatible with port mirroring and which is provided between the monitoring device 103 and the network. The captured packets are stored in the packet storage unit 329. The capture unit 301 assigns, to the stored packets, a date and time of capturing. The date and time is obtained from the clock unit 317.

The judgment unit 303 identifies 1 unprocessed packet out of the captured packets (S403). The judgment unit 303 identifies packets in order of, for example, capturing. The judgment unit 303 may discard already processed packets. In a case where there is no unprocessed packet, the judgment unit 303 waits until a subsequent packet is captured.

The judgment unit 303 determines whether or not an identified packet is a packet of a Kerberos authentication protocol (S405). Specifically, in a case where a transmission source port number set in the relevant packet is a number "88" assigned to the Kerberos authentication, the judgment unit 303 determines that the relevant packet is a packet of the Kerberos authentication protocol. In a case where the relevant packet is determined as a packet of the Kerberos authentication protocol, the first recording processing unit 307 performs the first recording processing (S407).

Figure 5:
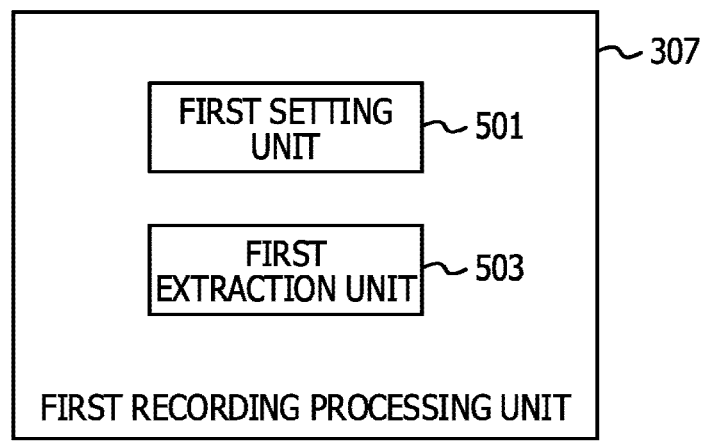
FIG. 5 is a diagram illustrating an example of a module configuration of a first recording processing unit.

Before describing the first recording processing, an example of a module configuration of the first recording processing unit 307 will be described. FIG. 5 illustrates an example of a module configuration of the first recording processing unit 307. The first recording processing unit 307 includes a first setting unit 501 and a first extraction unit 503.

The first setting unit 501 sets various types of data in a new record of the issuance log. The first extraction unit 503 extracts various types of data from a packet of the Kerberos authentication protocol.

The first setting unit 501 and the first extraction unit 503, described above, are realized by using hardware resources (in, for example, FIG. 24) and a program to cause a processor to perform processing described later.

Figure 6:
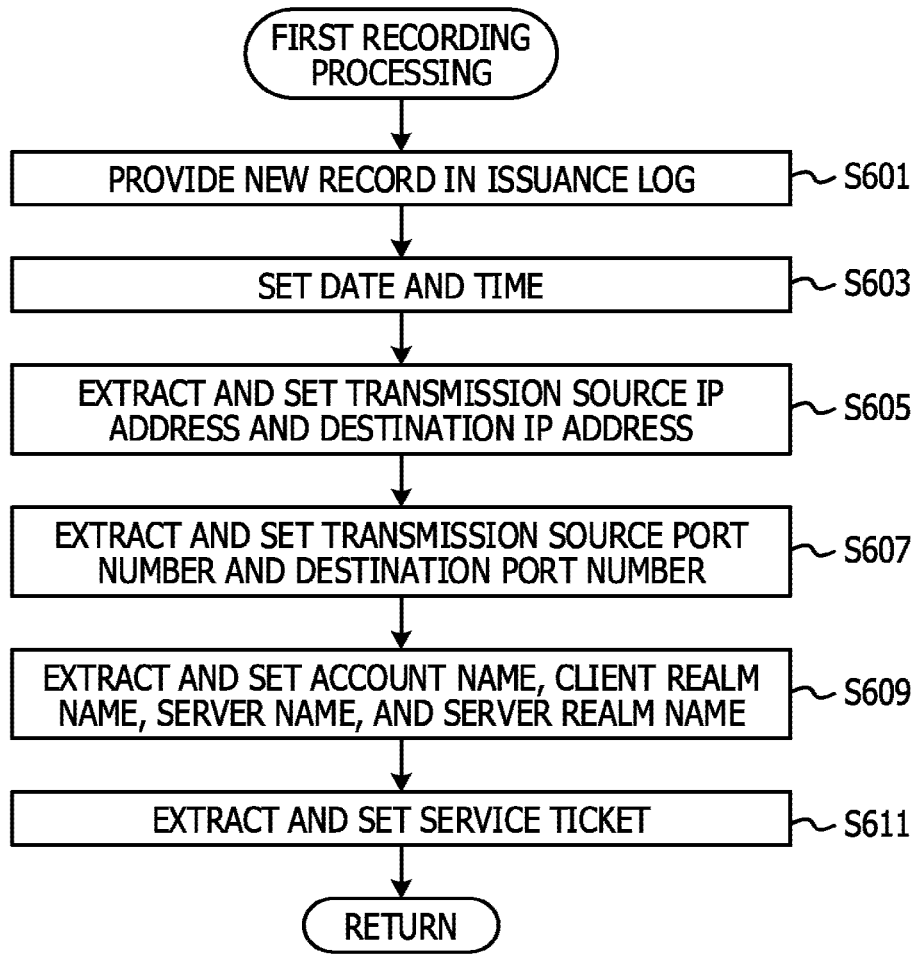
FIG. 6 is a diagram illustrating a first recording processing flow.

FIG. 6 illustrates a first recording processing flow. The first recording processing unit 307 provides a new record in the issuance log (S601).

FIG. 7 illustrates an example of a configuration of an issuance log. The issuance log in this example has a table form. In this regard, however, the issuance log may have a form other than the table form. The issuance log in this example includes a record corresponding to a response message of issuance of a service ticket. The relevant record includes a field for setting a date and time, a field for setting a transmission source IP address, a field for setting a transmission source port number, a field for setting a destination IP address, a field for setting a destination port number, a field for setting a client realm name and an account name, a field for setting a server realm name and a server name, and a field for setting a service ticket.

The date and time is a date and time of capturing a packet of the relevant response message. The transmission source IP address and the destination IP address are extracted from the IP header of the relevant response message. The transmission source port number and the destination port number are extracted from the transmission control protocol (TCP) header or the user datagram protocol (UDP) header (hereinafter, called a UDP/TCP header) of the relevant response message. The account name identifies an account that requests the service ticket. The client realm name identifies a realm to which the client computer 201 belongs. The server name identifies the server computer 203. The server realm name identifies a realm to which the server computer 203 belongs. While, in this example, the client realm name and the account name are recorded in a unified manner, the client realm name and the account name may be separately recorded. While, likewise, the server realm name and the server name are recorded in a unified manner, the server realm name and the server name may be separately recorded.

The description returns to FIG. 6. The first setting unit 501 sets, in the new record, a date and time when the packet identified in S403 is captured (S603).

The first extraction unit 503 extracts, from the IP header of the relevant packet, the transmission source IP address and the destination IP address, and the first setting unit 501 sets, in the new record, the extracted transmission source IP address and destination IP address (S605). The first extraction unit 503 extracts, from the UDP/TCP header of the relevant packet, the transmission source port number and the destination port number, and the first setting unit 501 sets, in the new record, the extracted transmission source port number and destination port number (S607).

The first extraction unit 503 extracts, from the relevant packet, the account name, the client realm name, the server name, and the server realm name, and the first setting unit 501 sets, in the new record, the extracted account name, client realm name, server name, and server realm name (S609).

The first extraction unit 503 extracts the service ticket from the relevant packet, and the first setting unit 501 sets the extracted service ticket in the new record (S611). After the first recording processing finishes, the processing returns to the processing operation in S403 illustrated in FIG. 4, and the above-mentioned processing operations are repeated.

The description returns to FIG. 4. In a case of determining, in S405, that the packet identified in S403 is not a packet of the Kerberos authentication protocol, the judgment unit 303 determines whether or not the relevant packet is a packet of an SMB protocol (S409). Specifically, in a case where data indicating that a protocol is the SMB is set in the relevant packet, the judgment unit 303 determines that the relevant packet is an SMB packet. In a case where it is determined that the relevant packet is not an SMB packet, the processing returns to the processing operation illustrated in S403, and the above-mentioned processing operations are repeated. The term "SMB packet" means a packet used for control based on the SMB protocol.

Figure 8:
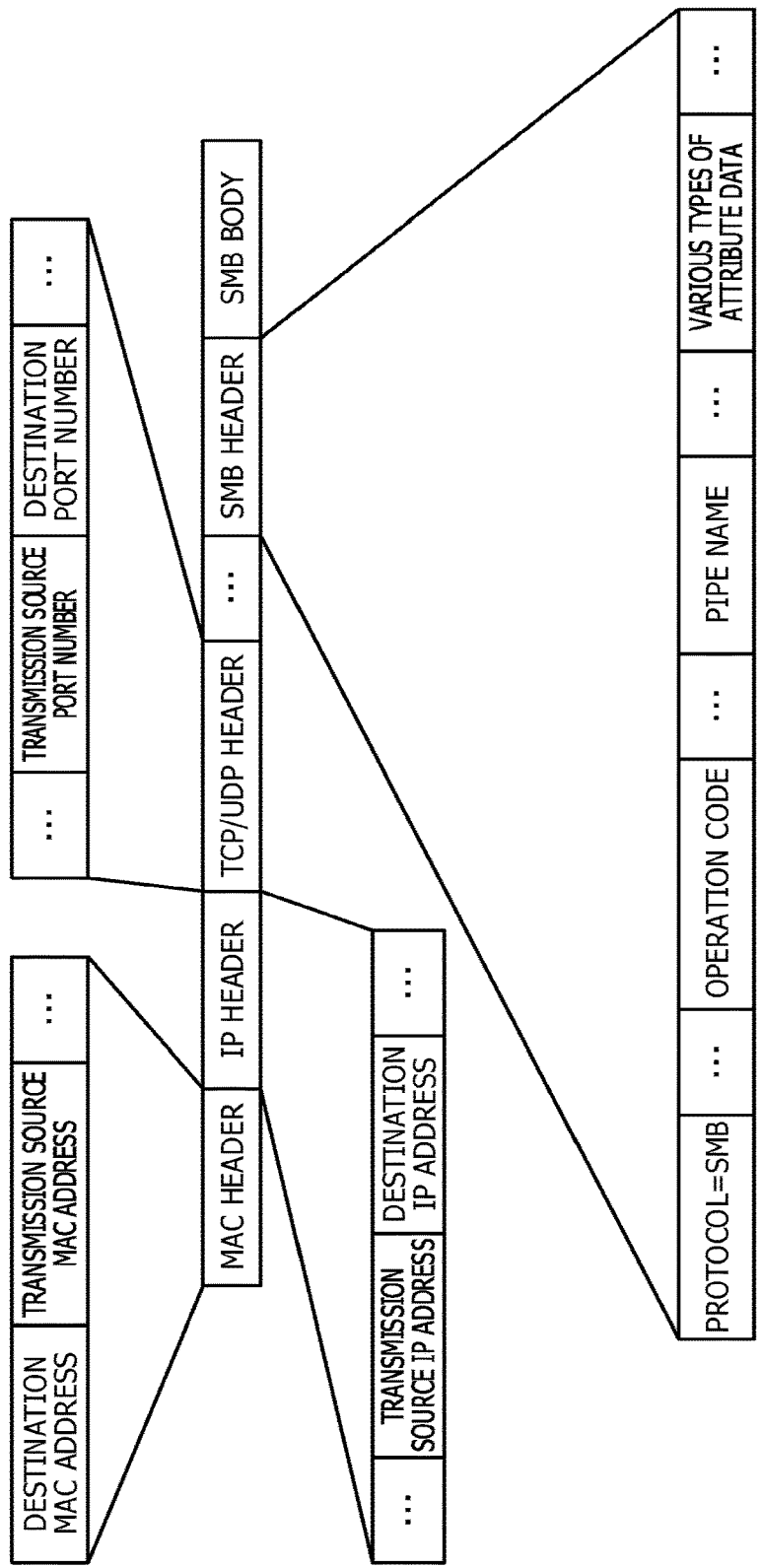
FIG. 8 is a diagram illustrating a configuration of a server message block (SMB) packet.

FIG. 8 illustrates a configuration of an SMB packet. As illustrated in FIG. 8, a media access control (MAC) header includes a field in which a destination MAC address is set and a field in which a transmission source MAC address is set. The transmission source MAC address is a MAC address of the corresponding computer 101 that sends the relevant packet. The destination MAC address is a MAC address of the corresponding computer 101 that receives the relevant packet.

In addition, an IP header includes a field in which a transmission source IP address is set and a field in which a destination IP address is set. The transmission source IP address is the IP address of the corresponding computer 101 that sends the relevant packet. The destination IP address is the IP address of the corresponding computer 101 that receives the relevant packet.

In a case where the SMB packet is sent in accordance with the TCP, the relevant packet includes a TCP header. In a case where the SMB packet is sent in accordance with the UDP, the relevant packet includes a UDP header. In a case of each of the TCP header and the UDP header, the relevant header includes a field in which a transmission source port number is set and a field in which a destination port number is set. The transmission source port number is the number of a port from which the relevant packet is sent. The destination port number is the number of a port from which the relevant packet is received.

Note that, in this example, a header related to NetBios is omitted.

The SMB packet includes an SMB header and an SMB body. The SMB header includes a field in which a protocol is set, a field in which an operation code is set, and a field in which a pipe name is set. The identifier of the SMB is set in the protocol. Note that the identifier of the SMB includes a version of the SMB. The operation code is the identifier of a command (corresponding to a remote operation) in the SMB. The pipe name is the name of a pipe serving as one of data transmission modes. The pipe name is uniquely defined for a service. Accordingly, a service to be used is identified by the pipe name thereof.

The SMB header includes various types of attribute data. In this regard, however, attribute items and storage positions vary depending on the type of the SMB packet in some cases. The type of the SMB packet is judged based on both or one of the operation code and the pipe name. Examples of the attribute data will be described later.

The description returns to FIG. 4. In a case of determining, in S409, that the packet identified in S403 is an SMB packet, the judgment unit 303 further determines whether or not the packet identified in S403 corresponds to a request message of the SMB authentication (S411). Specifically, in a case where an operation code (SessionSetup) of the SMB authentication is set in the SMB header, the judgment unit 303 determines that the relevant packet corresponds to a request message of the SMB authentication.

In a case where it is determined that the relevant packet corresponds to a request message of the SMB authentication, the second recording processing unit 309 performs the second recording processing (S413).

Before describing the second recording processing, an example of a configuration of a request message of the SMB authentication and an example of a module configuration of the second recording processing unit 309 will be described.

Figure 9:
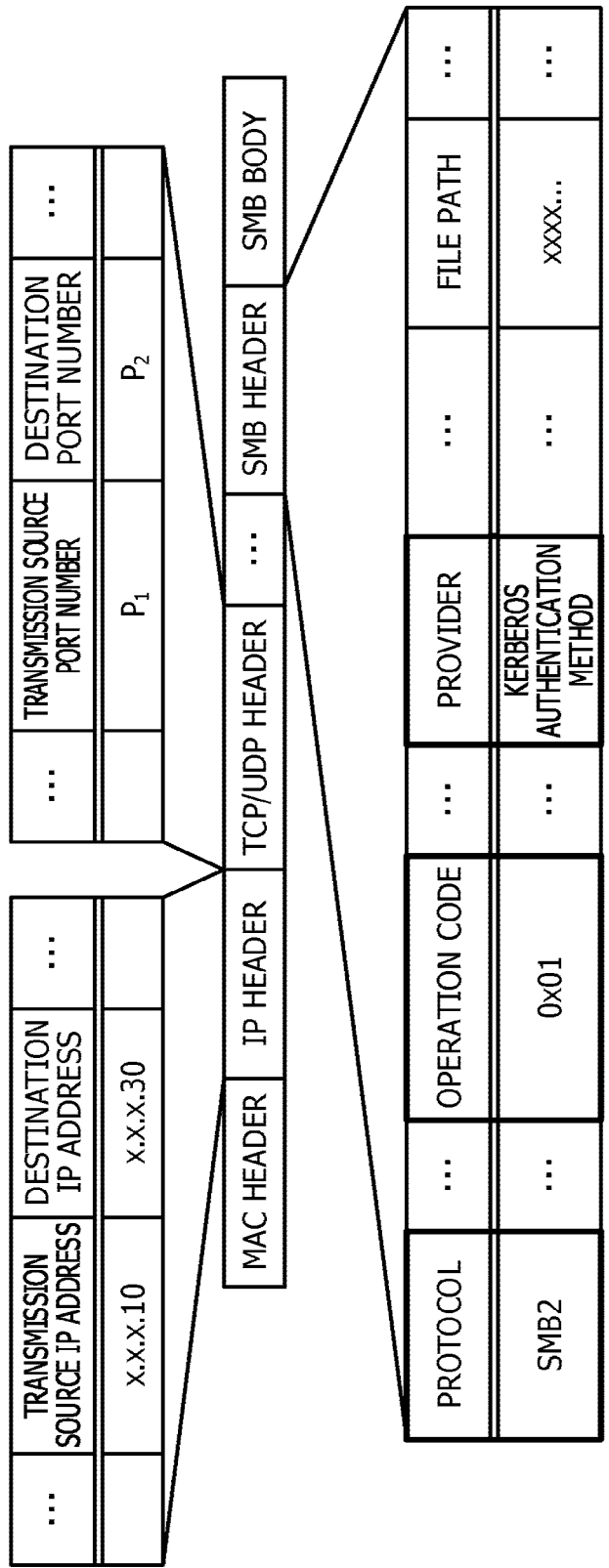
FIG. 9 is a diagram illustrating an example of a request message of SMB authentication.

FIG. 9 illustrates an example of a request message of the SMB authentication. In this example, the computers 101 are judged based on IP addresses. Therefore, no MAC address will be mentioned. In this regard, however, the computers 101 may be judged based on MAC addresses.

It is assumed that a request message of the SMB authentication, illustrated in FIG. 9, is sent to the computer 101 having an IP address "x.x.x.30" by the computer 101 having an IP address "x.x.x.10". Accordingly, "x.x.x.10" is set in the field of the transmission source IP address, and "x.x.x.30" is set in the field of the destination IP address.

It is assumed that the relevant request message is sent from a port having a port number "$P_1$" in the computer 101 serving as a transmission source to a port having a port number "$P_2$" in the computer 101 serving as a destination. Accordingly, "$P_1$" is set in in the field of the transmission source port number, and "$P_2$" is set in in the field of the destination port number.

It is assumed that a procedure of the SMB authentication in this example is compliant with the version 2 of the SMB. Accordingly, "SMB2" is set in the field of the protocol. "0x01" of the operation code corresponds to a request for authentication. A provider identifies an authentication method. The provider is called a security blob in some cases. In this example, the "Kerberos authentication method" is set. Note that while "NT LAN Manager (NTLM)" is set in the provider in some cases, it is not defined as a target of logging, in the present embodiment, in a case of authentication based on the NTLM.

In a case of matching a condition that a protocol set in a captured packet is "SMB2" and an operation code set therein is "0x01", it is determined that the relevant packet corresponds to a request message of the SMB authentication.

Figure 10:
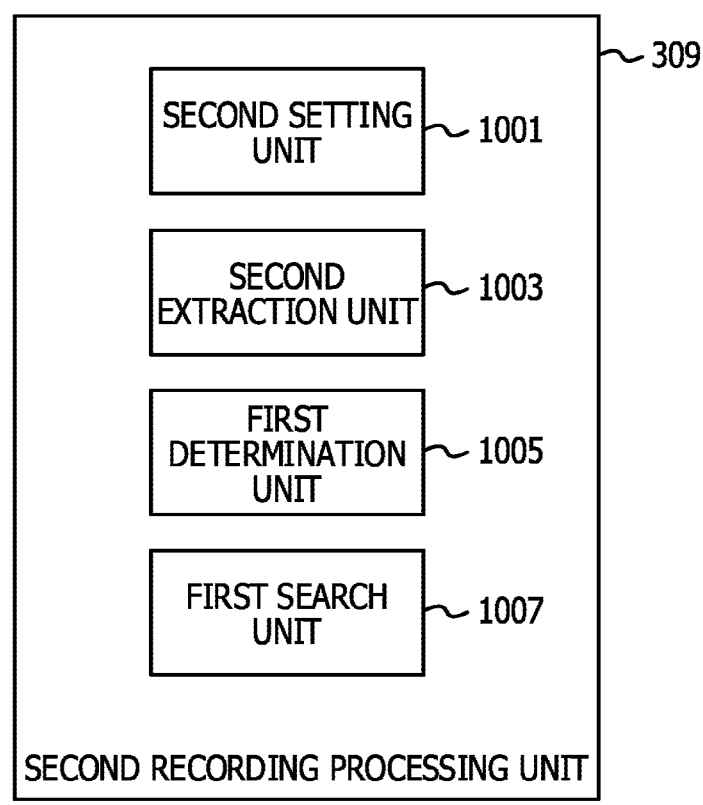
FIG. 10 is a diagram illustrating an example of a module configuration of a second recording processing unit.

FIG. 10 illustrates an example of a module configuration of the second recording processing unit 309. The second recording processing unit 309 includes a second setting unit 1001, a second extraction unit 1003, a first determination unit 1005, and a first search unit 1007.

The second setting unit 1001 sets various types of data in a new record of the authentication log. The second extraction unit 1003 extracts various types of data from a packet corresponding to a request message of the SMB authentication. The first determination unit 1005 determines whether or not the "Kerberos authentication method" is set in the field of the provider in a request message of the SMB authentication. The first search unit 1007 searches, within the issuance log, for a record including a specific service ticket.

The second setting unit 1001, the second extraction unit 1003, the first determination unit 1005, and the first search unit 1007, described above, are realized by using hardware resources (in, for example, FIG. 24) and a program to cause a processor to perform processing described later.

Figure 11:
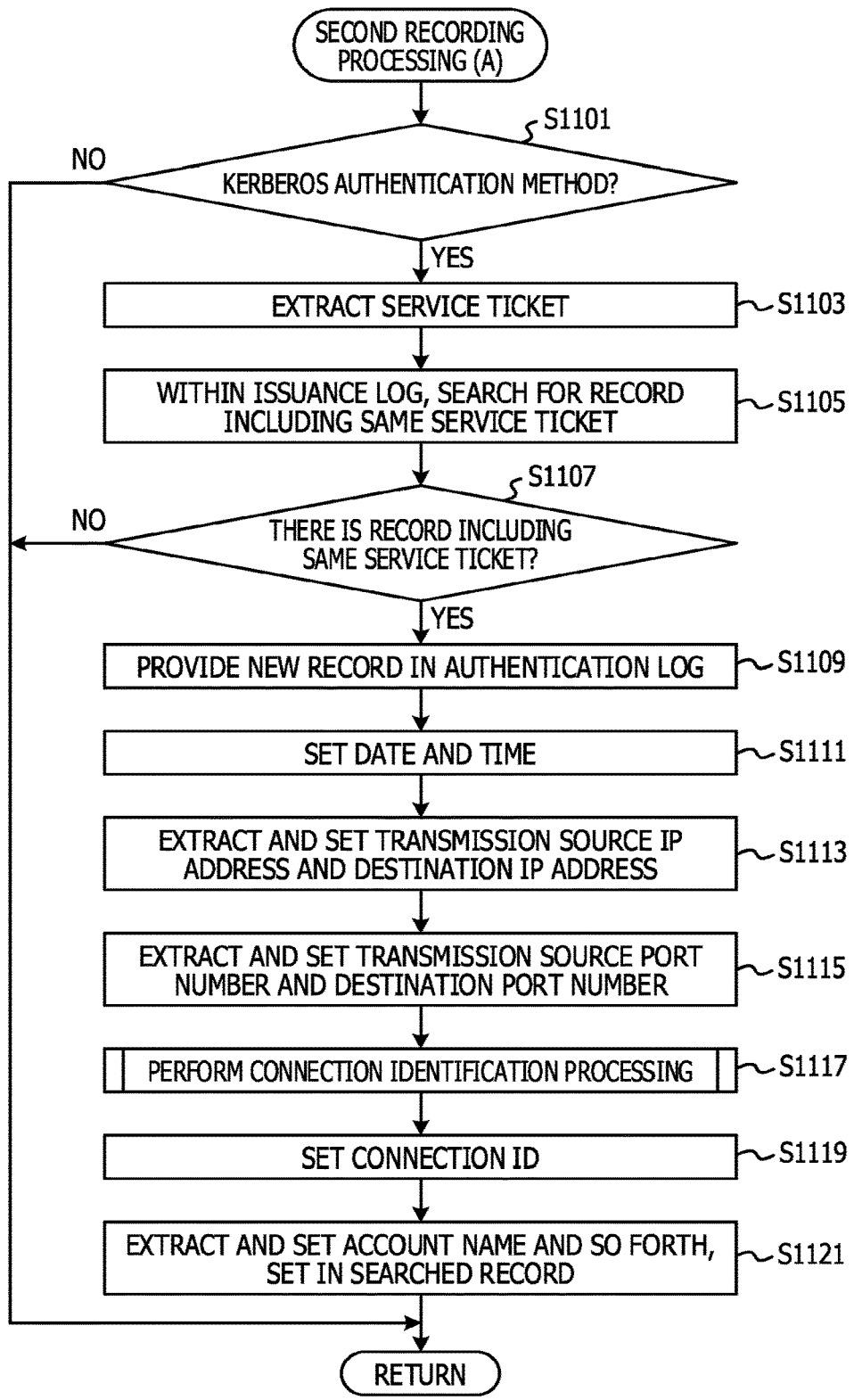
FIG. 11 is a diagram illustrating a second recording processing (A) flow.

Next, the second recording processing (A) will be described. FIG. 11 illustrates a second recording processing (A) flow. The first determination unit 1005 determines whether or not the "Kerberos authentication method" is set in the field of the provider (S1101). In a case where it is determined that the "Kerberos authentication method" is not set in the field of the provider, the second recording processing (A) is terminated, the processing returns to the processing operation in S403 illustrated in FIG. 4, and the above-mentioned processing operations are repeated.

On the other hand, in a case where it is determined that the "Kerberos authentication method" is set in the field of the provider, the second extraction unit 1003 extracts a service ticket from the packet identified in S403 (S1103). The first search unit 1007 searches, within the issuance log, for a record including the same service ticket as the extracted service ticket (S1105).

The first determination unit 1005 determines whether or not there is a record including the above-mentioned service ticket (S1107). In a case where it is determined that there is no record including the above-mentioned service ticket, the second recording processing (A) is terminated, the processing returns to the processing operation in S403 illustrated in FIG. 4, and the above-mentioned processing operations are repeated.

On the other hand, in a case where it is determined that there is a record including the above-mentioned service ticket, the second recording processing unit 309 provides a new record in the authentication log (S1109).

FIG. 12 illustrates an example of a configuration of an authentication log. The authentication log in this example has a table form. In this regard, however, the authentication log may have a form other than the table form. The authentication log in this example includes a record corresponding to a request message of the SMB authentication based on the Kerberos authentication method. The relevant record includes a field for setting a date and time, a field for setting a transmission source IP address, a field for setting a transmission source port number, a field for setting a destination IP address, a field for setting a destination port number, a field for setting a connection ID, a field for setting a client realm name and an account name, and a field for setting a server realm name and a server name.

The date and time is a date and time of capturing a packet of the relevant request message. The transmission source IP address and the destination IP address are extracted from the IP header of the relevant request message. The transmission source port number and the destination port number are extracted from the TCP/UDP header of the relevant request message. The account name identifies an account that requests issuance of the service ticket. The client realm name identifies a realm to which the client computer 201 belongs. The server name identifies the server computer 203. The server realm name identifies a realm to which the server computer 203 belongs. While, in this example, the client realm name and the account name are recorded in a unified manner, the client realm name and the account name may be separately recorded. While, likewise, the server realm name and the server name are recorded in a unified manner, the server realm name and the server name may be separately recorded.

The description returns to FIG. 11. The second setting unit 1001 sets, in the new record, a date and time when the packet identified in S403 is captured (S1111).

The second extraction unit 1003 extracts, from the IP header of the relevant packet, the transmission source IP address and the destination IP address, and the second setting unit 1001 sets, in the new record, the extracted transmission source IP address and destination IP address (S1113). The second extraction unit 1003 extracts, from the UDP/TCP header of the relevant packet, the transmission source port number and the destination port number, and the second setting unit 1001 sets, in the new record, the extracted transmission source port number and destination port number (S1115).

The first identification unit 305 performs the connection identification processing (S1117). In the connection identification processing, the first identification unit 305 identifies a connection through which the packet identified in S403 is transmitted.

Figure 13:
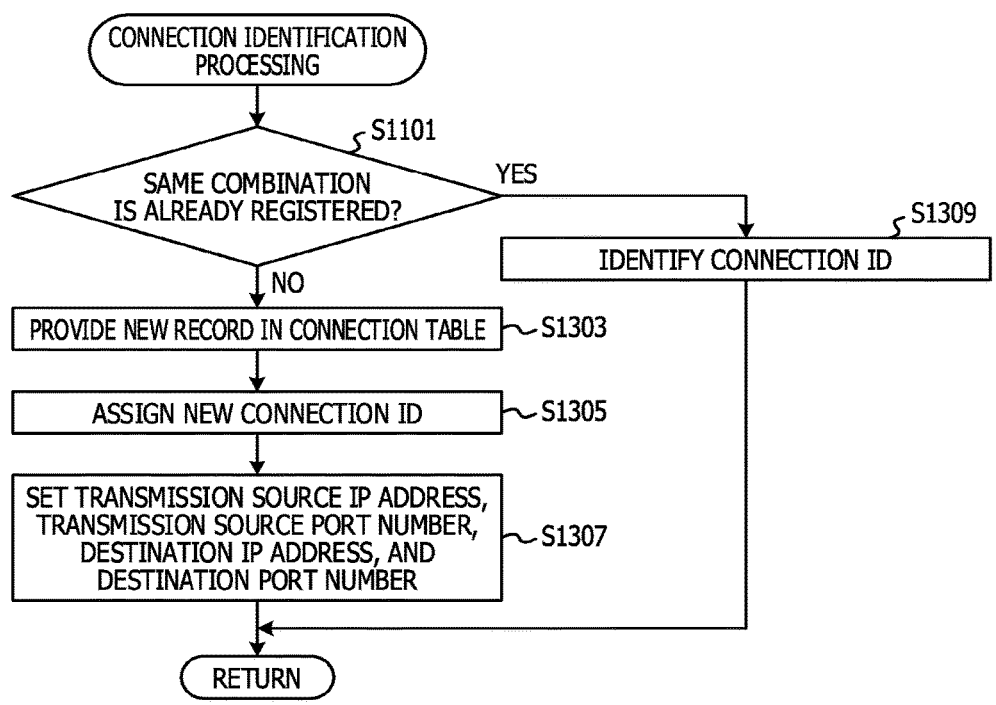
FIG. 13 is a diagram illustrating a connection identification processing flow.

FIG. 13 illustrates a connection identification processing flow. The first identification unit 305 determines whether or not the same combination as a combination of the transmission source IP address extracted in S1113, the transmission source port number extracted in S1115, the destination IP address extracted in S1113, and the destination port number extracted in S1115 is already registered in the connection table (S1301).

FIG. 14 illustrates an example of a configuration of a connection table. The connection table in this example includes a record corresponding to a connection. The relevant record includes a field for setting a connection ID, a field for setting a transmission source IP address, a field for setting a transmission source port number, a field for setting a destination IP address, and a field for setting a destination port number.

The connection ID identifies a connection. The connection is identified by a combination of the transmission source IP address, the transmission source port number, the destination IP address, and the destination port number.

The description returns to FIG. 13. In a case of determining, in S1301, that the above-mentioned combination is not registered in the connection table, the first identification unit 305 provides a new record in the connection table (S1303). The first identification unit 305 assigns a new connection ID to the new record (S1305). The first identification unit 305 sets, in the new record, the transmission source IP address extracted in S1113, the transmission source port number extracted in S1115, the destination IP address extracted in S1113, and the destination port number extracted in S1115 (S1307). Then, the processing returns to the second recording processing (A) illustrated in FIG. 11. In this case, in the second recording processing (A), a connection is identified based on the connection ID assigned in S1305.

On the other hand, in a case of determining, in S1301, that the above-mentioned combination is registered in the connection table, the first identification unit 305 identifies a connection ID corresponding to the above-mentioned combination (S1309). Then, the processing returns to the second recording processing (A) illustrated in FIG. 11.

The description returns to FIG. 11. The second setting unit 1001 sets the connection ID identified in the processing operation in S1117, in the new record provided in S1109 (S1119).

The second extraction unit 1003 extracts the account name, the client realm name, the server name, and the server realm name, set in the record searched for in S1105, and the second setting unit 1001 sets, in the new record, the extracted account name, client realm name, server name, and server realm name (S1121). If the second recording processing (A) finishes, the processing returns to the processing operation in S403 illustrated in FIG. 4, and the above-mentioned processing operations are repeated.

The description returns to FIG. 4. In a case of determining, in S411, that the packet identified in S403 does not correspond to a request message of the SMB authentication, the judgment unit 303 determines whether or not the relevant packet corresponds to a request message of the remote file access (S415). Specifically, in a case where an operation code (NTCreate) of the remote file access is set in the SMB header, the judgment unit 303 determines that the relevant packet corresponds to a request message of the remote file access. Note that the remote file access is established by request messages. Therefore, in accordance with a predetermined sequence of the remote file access, it is determined that a packet (hereinafter, called a second request message) following the packet (hereinafter, called a first request message) in which "NTCreate" is set also corresponds to a request message of the remote file access.

Figure 15:
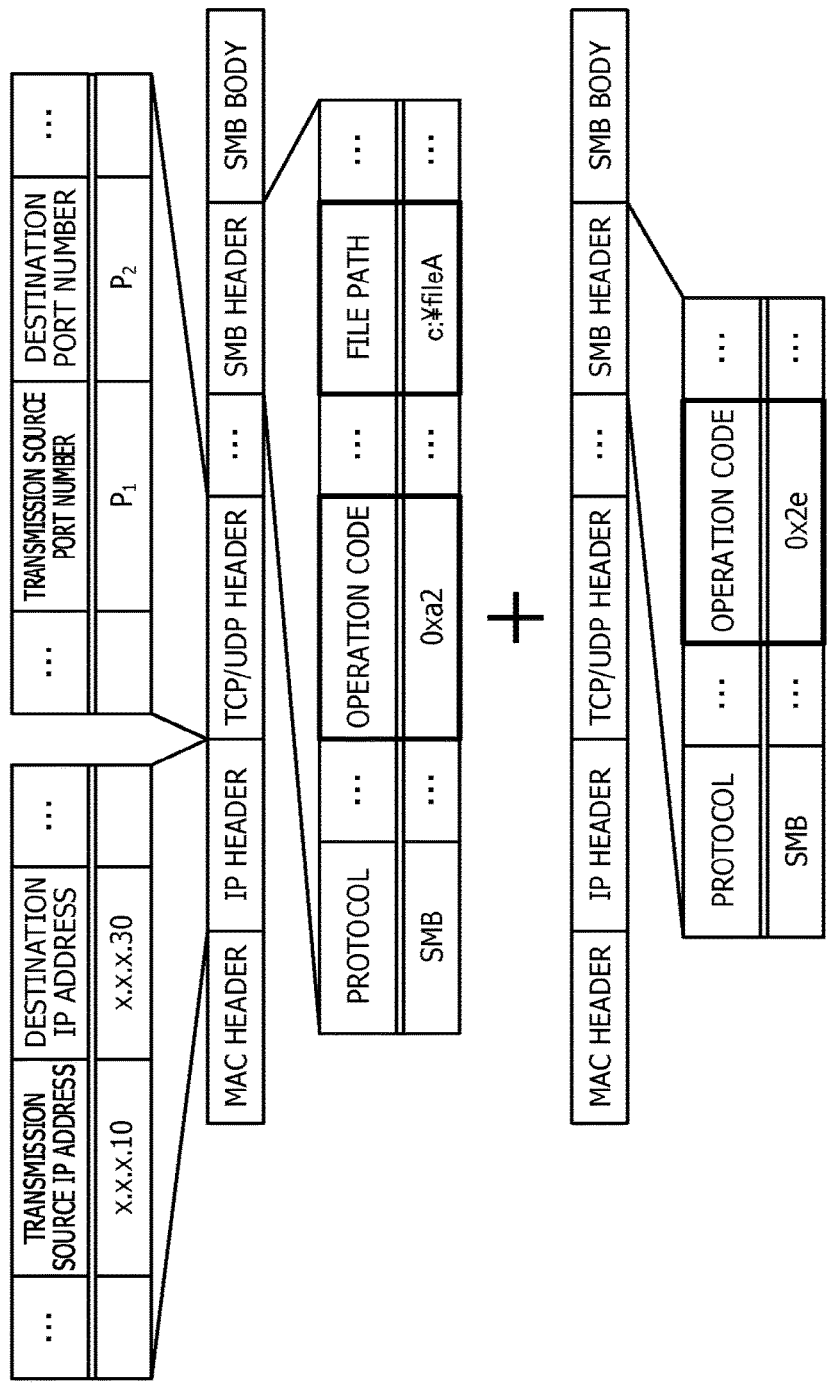
FIG. 15 is a diagram illustrating an example of a request message of file read.

FIG. 15 illustrates an example of a request message of file read. Depending on the type of the remote operation, there are a case where the request message is sent only once, thereby completing sending thereof, and a case where the request messages is sent more than once until the processing of the remote operation is completed. Examples illustrated in FIG. 15 and FIG. 20 to be described later each correspond to a case where the request message is sent more than once.

It is assumed that the first request message in the file read, illustrated in an upper stage, is sent to the computer 101 having the IP address "x.x.x.30" by the computer 101 having the IP address "x.x.x.10". Accordingly, "x.x.x.10" is set in the field of the transmission source IP address, and "x.x.x.30" is set in the field of the destination IP address. Note that the same applies to the second request message in the file read, illustrated in a lower stage.

It is assumed that the first request message in the file read, illustrated in the upper stage, is sent from a port in the computer 101 serving as a transmission source, which has the port number "$P_1$", to a port in the computer 101 serving as a destination, which has the port number "$P_2$". Accordingly, "$P_1$" is set in the field of the transmission source port number, and "$P_2$" is set in the field of the destination port number. Note that the same applies to the second request message in the file read, illustrated in the lower stage.

It is assumed that a procedure of the file read in this example is compliant with the version 1 of the SMB. Accordingly, "SMB" is set in the field of the protocol.

"0xa2" of the operation code of the first request message indicates "NTCreate". The operation code in a case of the SMB of the version 1 is 1 byte. A case of the operation code "0x01" in the first request message indicates a request for a file access. "0x2e" of the operation code in the second request message indicates that the type of the file access is file read.

In a case where the operation code set in the first request message is "0xa2" and the operation code set in the second request message (having the protocol, the transmission source IP address, the transmission source port number, the destination IP address, and the destination port number in common with the first request message) is "0x2e", it is determined that these request messages request the file read. Note that a file path is set in the first request message.

The description returns to FIG. 4. In a case where it is determined that the relevant packet corresponds to a request message of the remote file access, the third recording processing unit 311 performs the third recording processing (S417).

Figure 16:
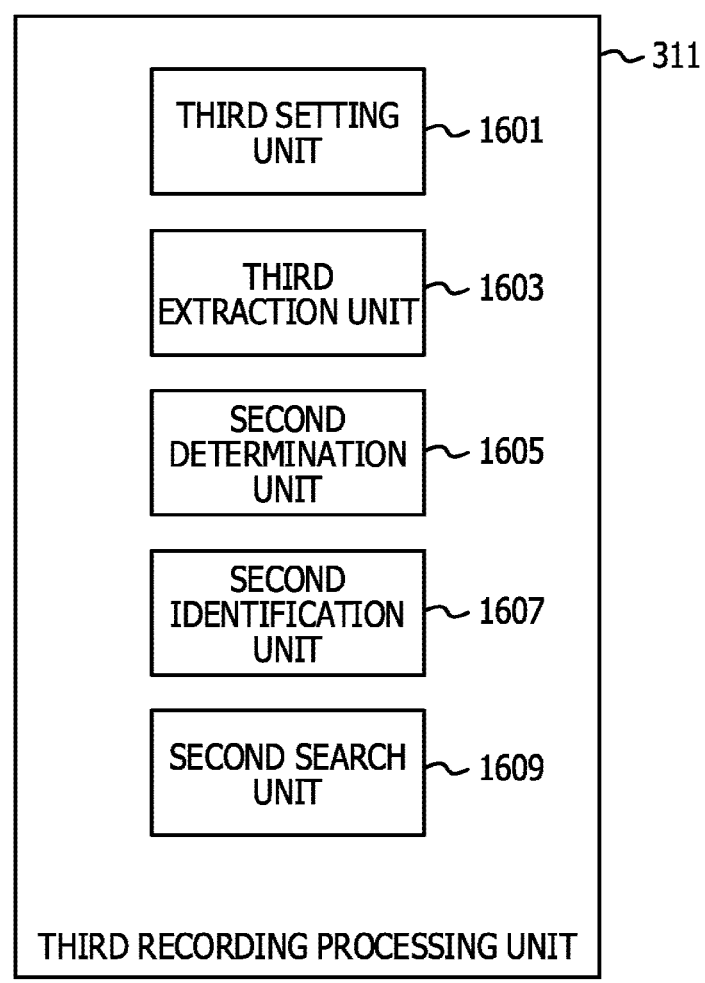
FIG. 16 is a diagram illustrating an example of a module configuration of a third recording processing unit.

Before describing the third recording processing, a module configuration of the third recording processing unit 311 will be described. FIG. 16 illustrates an example of a module configuration of the third recording processing unit 311. The third recording processing unit 311 includes a third setting unit 1601, a third extraction unit 1603, a second determination unit 1605, a second identification unit 1607, and a second search unit 1609.

The third setting unit 1601 sets various types of data in a new record of the operation log. The third extraction unit 1603 extracts various types of data from a packet corresponding to the request message of the remote file access. The second determination unit 1605 determines whether or not the packet serving as a processing target is the first request message. The second identification unit 1607 identifies a command name. The second search unit 1609 searches, within the authentication log, a record including a specific connection ID.

The third setting unit 1601, the third extraction unit 1603, the second determination unit 1605, the second identification unit 1607, and the second search unit 1609, described above, are realized by using hardware resources (in, for example, FIG. 24) and a program to cause a processor to perform processing described later.

Figure 17:
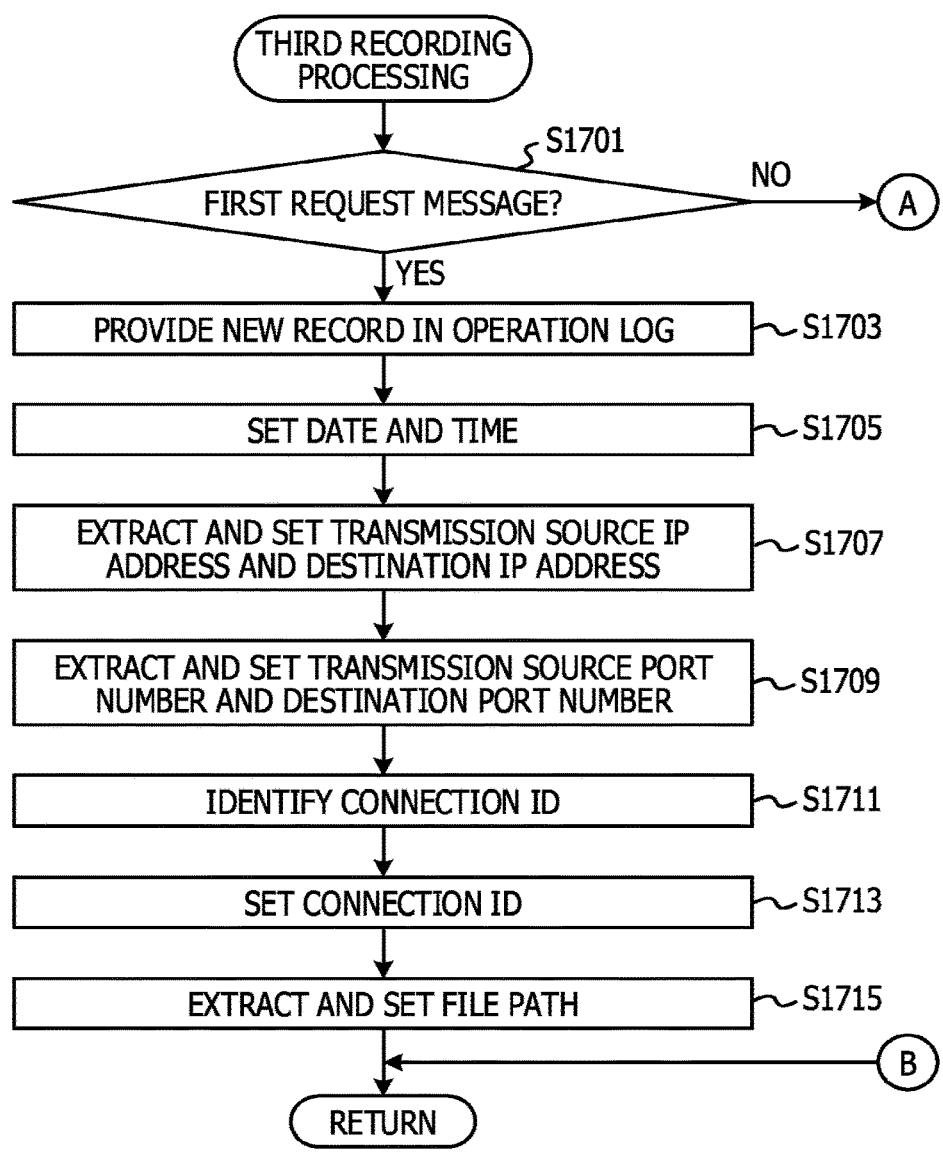
FIG. 17 is a diagram illustrating of a third recording processing flow.

FIG. 17 illustrates a third recording processing flow. In the third recording processing, data based on the first request message and the second request message related to the remote file access is set in the operation log. The second determination unit 1605 determines whether or not the packet identified in S403 is a packet in which "NTCreate" is set in the operation code, in other words, the first request message (S1701).

In a case where it is determined that the relevant packet is the first request message, the third recording processing unit 311 provides a new record in the operation log (S1703).

FIG. 19 illustrates an example of a configuration of an operation log. The operation log in this example has a table form. In this regard, however, the operation log may have a form other than the table form. The operation log in this example includes a record corresponding to a request message of the remote operation. The relevant record includes a field for setting a date and time, a field for setting a transmission source IP address, a field for setting a transmission source port number, a field for setting a destination IP address, a field for setting a destination port number, a field for setting a connection ID, a field for setting a command name and an option, and a field for setting attribute data.

In this example, the field for setting the attribute data is divided into a field for setting a client realm name and an account name, a field for setting a server realm name and a server name, and a field for setting a path or an account name. In this regard, however, a field for setting another attribute item may be included. In addition, the fields for setting the attribute data may be unified, and arbitrary attributes may be set therein.

The date and time is a date and time of capturing a packet of the relevant request message. Regarding the transmission source IP address, the transmission source IP address and the destination IP address are extracted from the IP header of the relevant request message. The transmission source port number and the destination port number are extracted from the TCP/UDP header of the relevant request message. The connection ID identifies a connection through which the relevant request message is transmitted. The command name and the option indicates a content of the remote operation. The option is not set, in some cases. The client realm name identifies a realm to which the client computer 201 belongs. The server name identifies the server computer 203. The server realm name identifies a realm to which the server computer 203 belongs. While, in this example, the client realm name and the account name are recorded in a unified manner, the client realm name and the account name may be separately recorded. While, likewise, the server realm name and the server name are recorded in a unified manner, the server realm name and the server name may be separately recorded. In this example, in a case where the command name is "file read", a file path is set in the field of the path or the account name. Likewise, in a case where the command name is "user registration", an account name is set in the field of the path or the account name.

The description returns to FIG. 17. The third setting unit 1601 sets, in the new record, a date and time when the relevant packet is captured (S1705).

The third extraction unit 1603 extracts, from the IP header of the relevant packet, the transmission source IP address and the destination IP address, and the third setting unit 1601 sets, in the new record, the extracted transmission source IP address and destination IP address (S1707). Furthermore, the third extraction unit 1603 extracts, from the TCP header or UDP header of the relevant packet, the transmission source port number and the destination port number, and the third setting unit 1601 sets, in the new record, the extracted transmission source port number and destination port number (S1709).

The first identification unit 305 references the connection table, thereby identifying a connection ID corresponding to a combination of the transmission source IP address, the transmission source port number, the destination IP address, and the destination port number (S1711). The third setting unit 1601 sets the connection ID in the new record (S1713).

The third extraction unit 1603 extracts a file path from the SMB header of the relevant packet, and the third setting unit 1601 sets the extracted file path in the field of the path or the account name in the new record (S1715). With that, setting of data based on the first request message finishes. In addition, the processing returns once to the processing operation in S403 illustrated in FIG. 4, and the above-mentioned processing operations are repeated.

Figure 18:
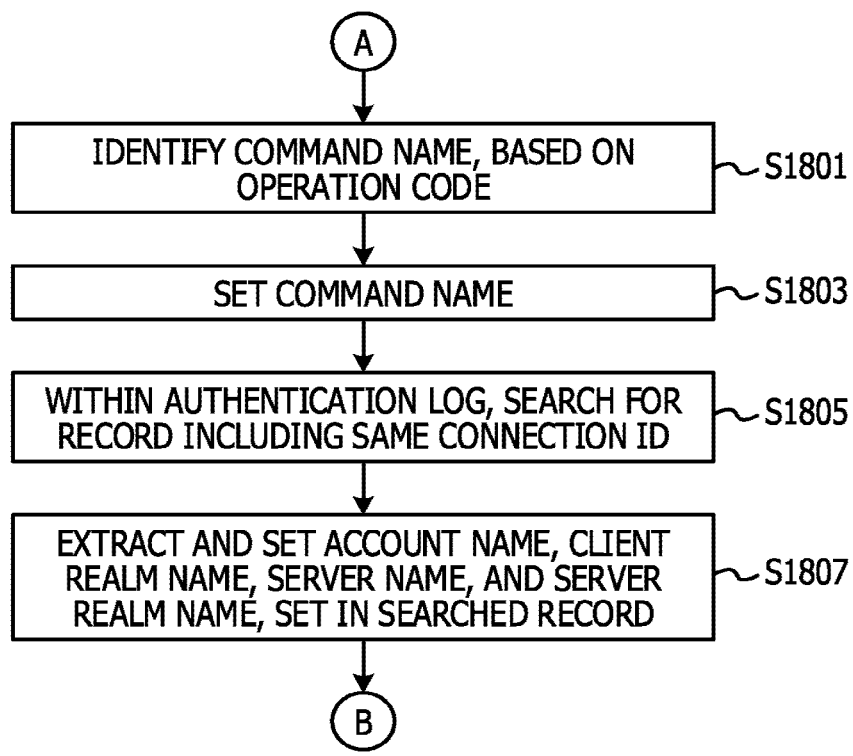
FIG. 18 is a diagram illustrating the third recording processing flow.

On the other hand, in a case where it is determined, in S1701, that the relevant packet is not the first request message, in other words, in a case where the relevant packet is the second request message, the processing shifts, via a terminal A, to a processing operation illustrated in S1801 in FIG. 18.

The second identification unit 1607 identifies a command name, based on the operation code (S1801). If the operation code is, for example, "0x2e", the command of the file read is identified. The third setting unit 1601 sets the identified command name, in a record in which data is set based on the first request message (S1803).

Within the authentication log, the second search unit 1609 searches for a record including the same connection ID as the connection ID identified in the processing operation in S1711, performed on the first request message (S1805).

The third extraction unit 1603 extracts an account name, a client realm name, a server name, and a server realm name, set in the searched record, and the third setting unit 1601 sets, in the new record of the operation log, the extracted account name, client realm name, server name, and server realm name (S1807). The processing returns, via a terminal B, to the processing illustrated in FIG. 17. If the third recording processing finishes, the processing returns to the processing operation in S403 illustrated in FIG. 4, and the above-mentioned processing operations are repeated.

The description returns to FIG. 4. In a case of determining, in S415, that the packet identified in S403 does not correspond to a request message of the remote file access, the judgment unit 303 determines whether or not it corresponds to a request message of another remote operation, in other words, a remote operation (called one of other remote operations in the following description of FIG. 4) other than the remote file access (S419). Specifically, in a case where a combination of the operation code and the pipe name set in the SMB header (alternatively, one of the operation code and the pipe name) is matched with one of patterns assumed as the other remote operations, the judgment unit 303 determines that the relevant packet corresponds to a request message of one of the other remote operations.

In a case where it is determined that the relevant packet corresponds to a request message of one of the other remote operations, the fourth recording processing unit 313 performs the fourth recording processing (S421).

In this example of processing, it is assumed that one of the other remote operations is established by 1 request message.

In this regard, however, among the other remote operations, there is a remote operation established by request messages in the same way as in a case of the remote file access. In that case, in the same way as in a case of the remote file access, processing is divided into 2 or more. In other words, it is assumed that the first request message and the second request message (a third and subsequent request messages are included in some cases) each correspond to a request message of the relevant other remote operation.

Hereinafter, an example of user registration will be described. Before describing the fourth recording processing, a request message of the user registration and a module configuration of the fourth recording processing unit 313 will be described.

Figure 20:
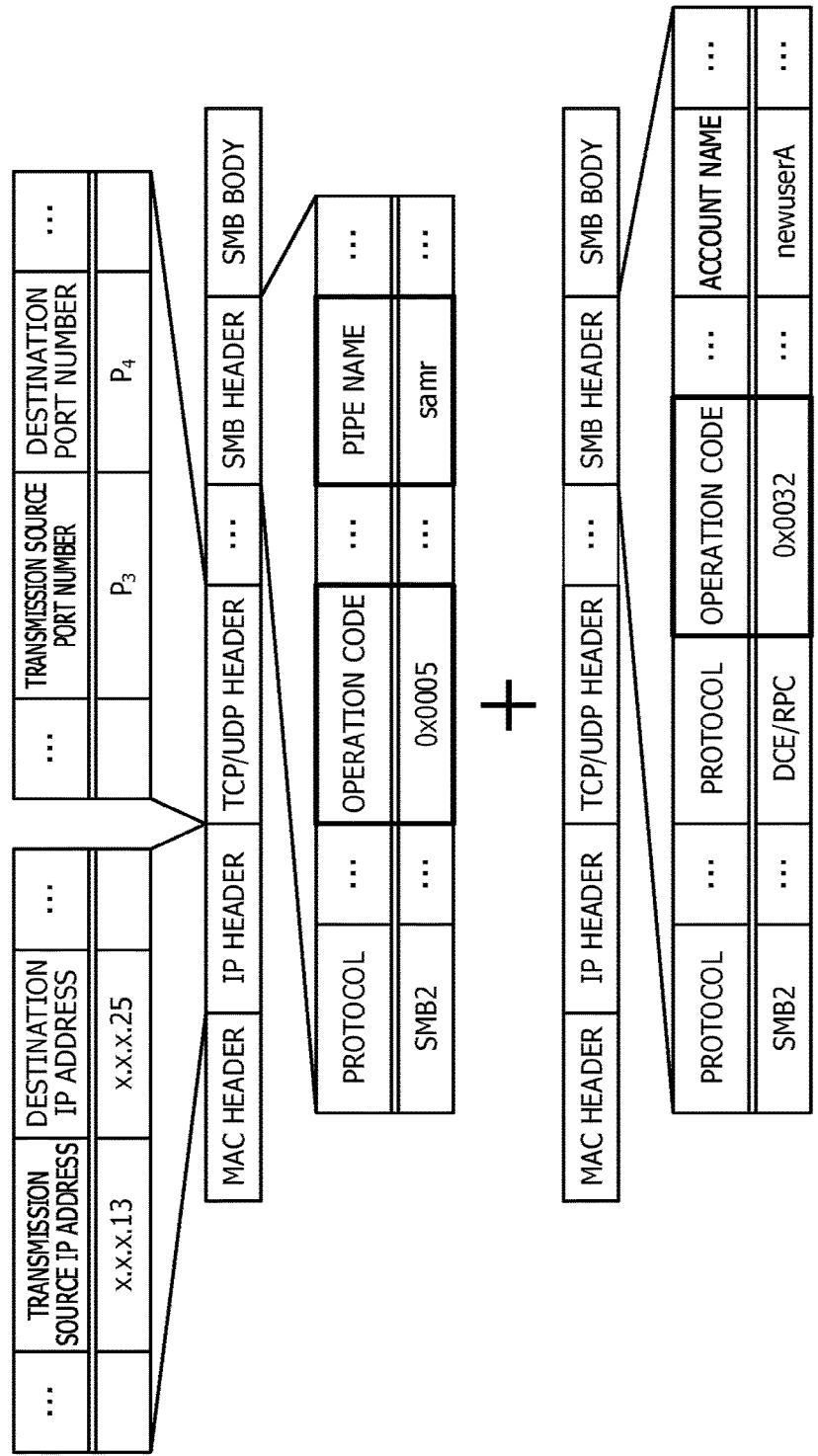
FIG. 20 is a diagram illustrating an example of a request message of user registration.

FIG. 20 illustrates an example of a request message of user registration. It is assumed that a first request message in the user registration, illustrated in an upper stage, is sent to the computer 101 having the IP address "x.x.x.25" by the computer 101 having the IP address "x.x.x.13". Accordingly, "x.x.x.13" is set in the field of the transmission source IP address, and "x.x.x.25" is set in the field of the destination IP address. Note that the same applies to the second request message in the user registration, illustrated in a lower stage.

It is assumed that a procedure of the user registration in this example is compliant with the version 2 of the SMB. Accordingly, "SMB2" is set in the field of the protocol.

In a case where the operation code set in the first request message is "0x0005", the pipe name set in the same packet is "samr", and the operation code set in the second request message (having the protocol, the transmission source IP address, the transmission source port number, the destination IP address, and the destination port number in common with the first request message) is "0x0032", it is determined that these request messages request the user registration. Note that the operation code in a case of the SMB of the version 2 is 2 bytes. The account name is set in the second request message.

Figure 21:
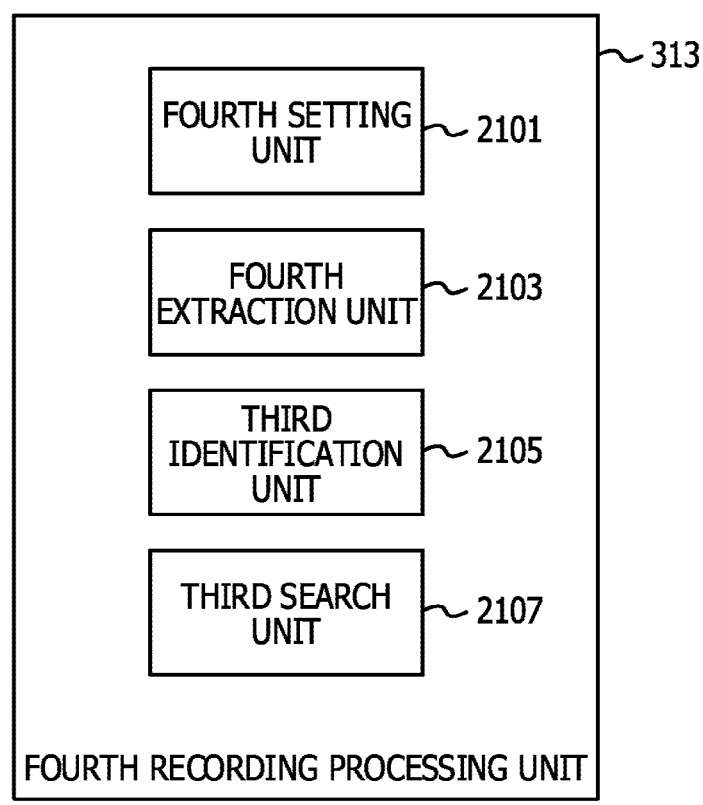
FIG. 21 is a diagram illustrating an example of a module configuration of a fourth recording processing unit.

FIG. 21 illustrates an example of a module configuration of the fourth recording processing unit 313. The fourth recording processing unit 313 includes a fourth setting unit 2101, a fourth extraction unit 2103, a third identification unit 2105, and a third search unit 2107.

The fourth setting unit 2101 sets various types of data in the new record of the operation log. The fourth extraction unit 2103 extracts various types of data from a packet corresponding to a request message of one of the remote operations other than the remote file access. The third identification unit 2105 identifies a command name. The third search unit 2107 searches, within the authentication log, a record including a specific connection ID.

The fourth setting unit 2101, the fourth extraction unit 2103, the third identification unit 2105, and the third search unit 2107, described above, are realized by using hardware resources (in, for example, FIG. 24) and a program to cause a processor to perform processing described later.

Figure 22:
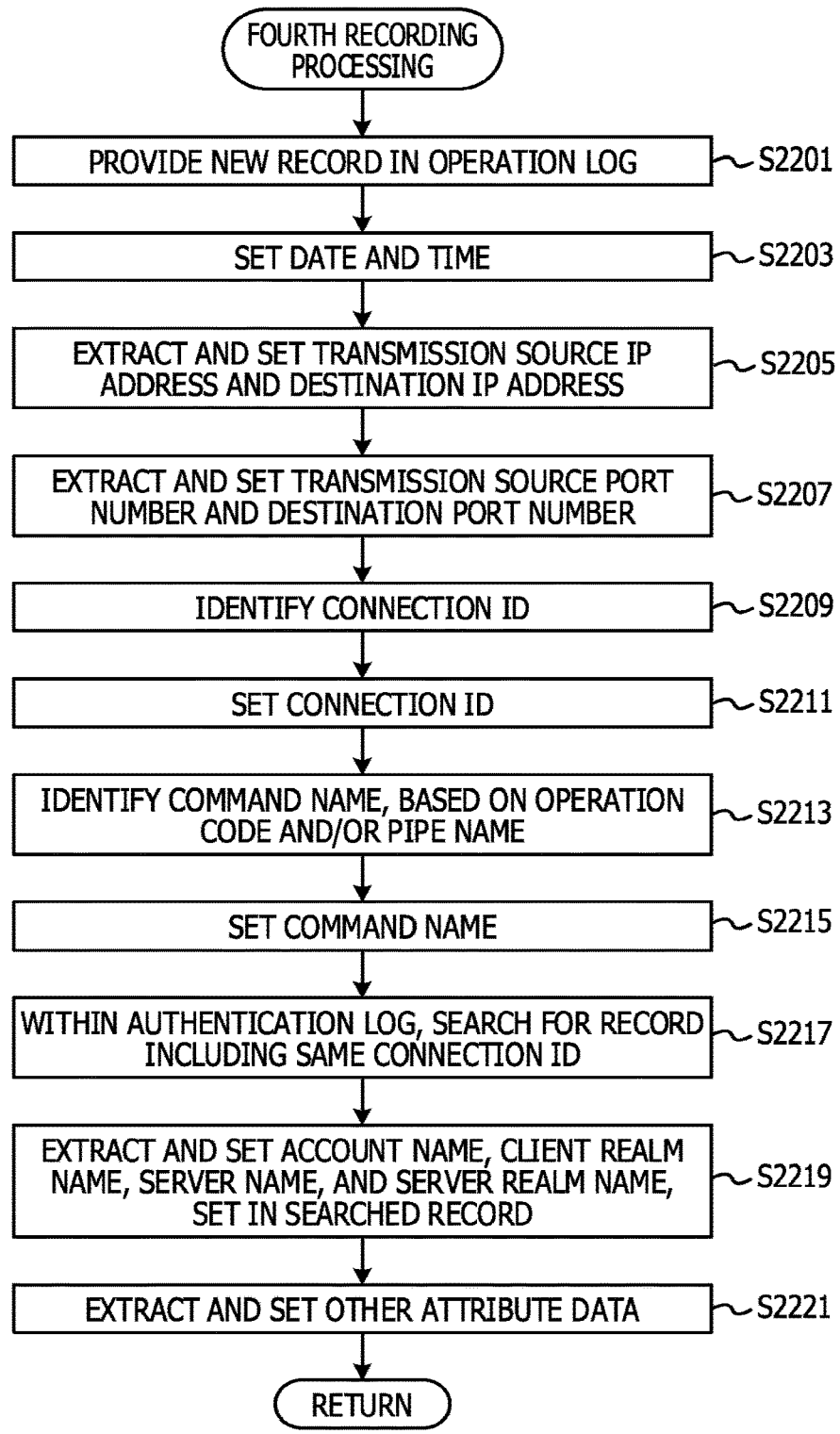
FIG. 22 is a diagram illustrating a fourth recording processing flow.

Next, the fourth recording processing will be described. FIG. 22 illustrates a fourth recording processing flow. The fourth recording processing unit 313 provides a new record in the operation log (S2201). The fourth setting unit 2101 sets, in the new record, a date and time when a packet corresponding to a request message of one of the other remote operations other than the remote file access is captured (S2203).

The fourth extraction unit 2103 extracts, from the IP header of the relevant packet, the transmission source IP address and the destination IP address, and the fourth setting unit 2101 sets, in the new record, the extracted transmission source IP address and destination IP address (S2205). Furthermore, the fourth extraction unit 2103 extracts, from the UDP/TCP header of the relevant packet, the transmission source port number and the destination port number, and the fourth setting unit 2101 sets, in the new record, the extracted transmission source port number and destination port number (S2207).

The third identification unit 2105 references the connection table, thereby identifying a connection ID corresponding to a combination of the transmission source IP address, the transmission source port number, the destination IP address, and the destination port number (S2209). The fourth setting unit 2101 sets the connection ID in the new record (S2211).

The third identification unit 2105 identifies a command name, based on the operation code and/or a service identifier (S2213). Specifically, in accordance with a predetermined rule, the third identification unit 2105 identifies the command name of a remote operation (alternatively, a combination of the command name and an option) corresponding to a combination of the operation code and the pipe name (alternatively, one of the operation code and the pipe name).

The fourth setting unit 2101 sets, in the new record, the identified command name (alternatively, a combination of the command name and an option) (S2215).

Note that in a case where the command name (alternatively, a combination of the command name and an option) is identified based on the first request message and the second request message (the third and subsequent request messages are included in some cases), the command name (alternatively, a combination of the command name and an option) is identified in a stage of performing processing on a subsequent request message, in the same way as in a case of the third recording processing.

Within the authentication log, the third search unit 2107 searches for a record including the same connection ID as the connection ID identified in the processing operation in S2209 (S2217).

The fourth extraction unit 2103 extracts an account name, a client realm name, a server name, and a server realm name, set in the searched record, and the fourth setting unit 2101 sets, in the new record of the operation log, the extracted account name, client realm name, server name, and server realm name (S2219).

In accordance with a predetermined rule corresponding to the command name (alternatively, a combination of the command name and an option) identified in S2213, the fourth extraction unit 2103 extracts attribute data other than the account name. In addition, the fourth setting unit 2101 sets the extracted attribute data, in the field of the attribute data in the new record (S2221).

The fourth extraction unit 2103 may acquire the attribute data from the SMB body. In addition, in a case where there is no attribute data to be extracted, the processing operation in S2221 may be omitted.

In a case where attribute data to be extracted is included in the second request message (the third and subsequent request messages are included in some cases), the processing operation in S2221 may be performed in a stage of performing processing on a subsequent request message.

Note that in a case of analyzing the subsequent request message, the rank orders of the request messages may be judged, and processing corresponding the rank order of each of the request messages may be performed. After the fourth recording processing finishes, the processing returns to the processing operation in S403 illustrated in FIG. 4, and the above-mentioned processing operations are repeated.

The description returns to FIG. 4. In a case where it is determined, in S419, that the packet identified in S403 does not correspond to a request message of one of the other remote operations, the relevant packet is regarded as not corresponding to a log target. Accordingly, the processing returns, without change, to the processing operation illustrated in S403, and the above-mentioned processing operations are repeated.

According to the present embodiment, it is possible to identify an account that performs a remote operation based on a service ticket issued by the ticket issuing server 111. In addition, there is an aspect that associating an account, authenticated by the authentication server 109, with recording of a remote operation is helpful in identifying an illegal remote operation.

Second Embodiment

Figure 23:
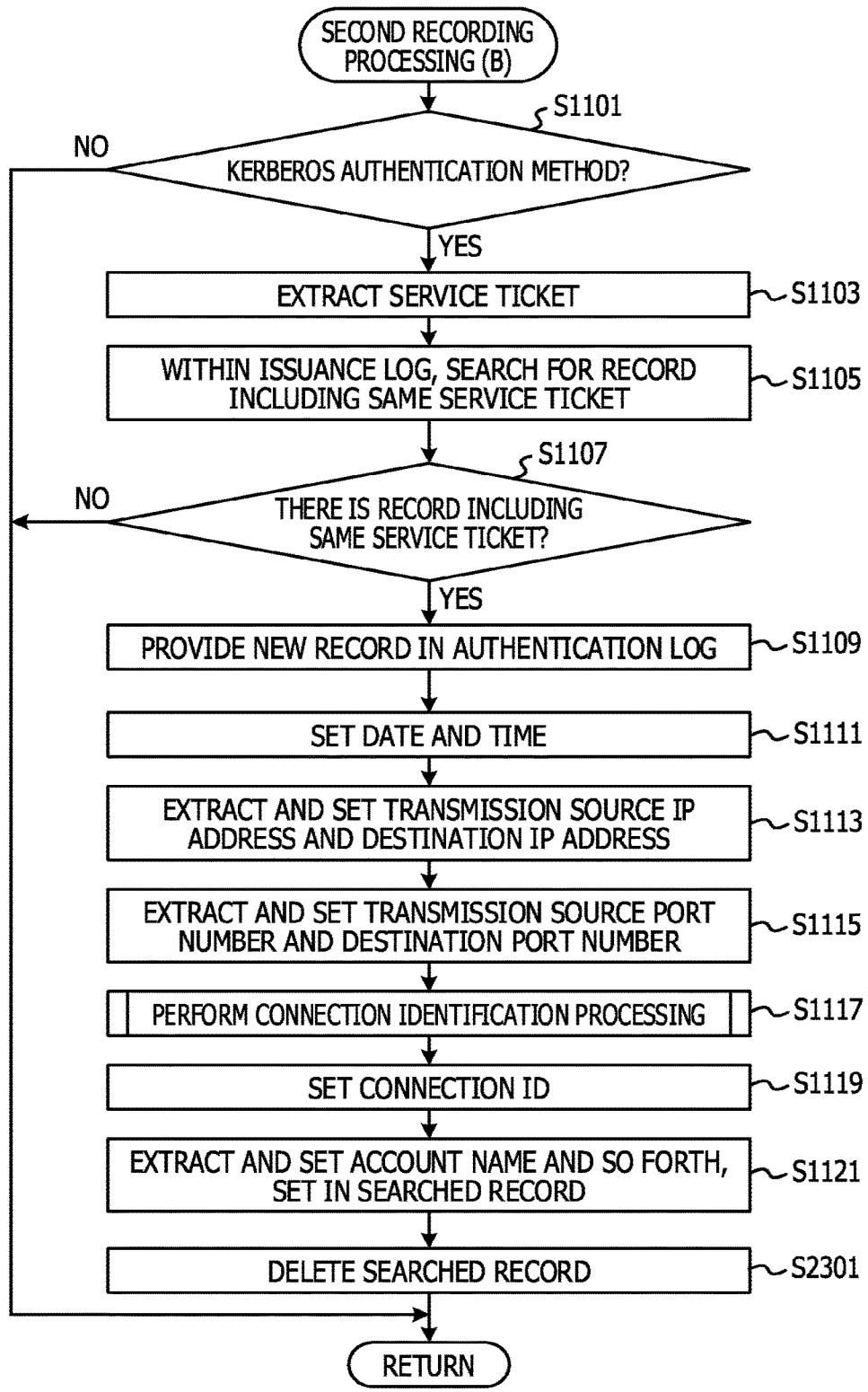
FIG. 23 is a diagram illustrating a second recording processing (B) flow.

In the present embodiment, an example of deleting an already processed service ticket will be described. In S413 in FIG. 4, the second recording processing (B) is performed in place of the second recording processing (A) illustrated in FIG. 11. FIG. 23 illustrates a second recording processing (B) flow. Processing operations in S1101 to S1121 are the same as in a case of the second recording processing (A).

Subsequent to the processing operation in S1121, the deletion unit 315 deletes the record of the issuance log, searched for in S1105 (S2301).

According to the present embodiment, it is possible to suppress a data amount to be recorded.

While embodiments of the present technology are described above, the present technology is not limited thereto. There is, for example, a case where the above-mentioned functional block configuration does not coincide with a program module configuration in some cases.

In addition, the configuration of each of the memory areas described above is just an example and does not have to have such a configuration as described above. Furthermore, in each of the processing flows, the order of processing operations may be changed or processing operations may be performed in parallel as long as no processing result changes.

Note that the above-mentioned monitoring device 103 is a computer device, in which a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 for connecting to a network are connected to one another via a bus 2519, as illustrated in FIG. 24. An operating system (OS) and an application program to perform processing in the present embodiments are stored in the HDD 2505 and are read from the HDD 2505 to the memory 2501 at a time of being executed by the CPU 2503. In accordance with a content of processing of the application program, the CPU 2503 controls the display control unit 2507, the communication control unit 2517, and the drive device 2513, thereby causing predetermined operations to be performed. In addition, while currently processed data is mainly stored in the memory 2501, the currently processed data may be stored in the HDD 2505. In each of embodiments of the present technology, the application program for implementing the above-mentioned processing is distributed while being stored in a computer-readable removable disk 2511 and is installed from the drive device 2513 to the HDD 2505. The application program is installed to the HDD 2505 via a network such as the Internet and the communication control unit 2517 in some cases. In such a computer, hardware such as the above-mentioned CPU 2503 and memory 2501 and programs such as the OS and the application program organically collaborate with one another, thereby realizing such various types of functions as described above.

Summarization of the above-mentioned embodiments of the present technology is as follows.

A network monitoring method according to the present embodiment includes a process including (A) extracting, from communication data of a credential issuing device, an issued credential and identification data of an account that requests the relevant credential, (B) identifying a connection through which an authentication request of a remote operation protocol, which includes the credential, is transmitted, and (C) associating the identification data with recording of a remote operation in the connection.

By doing this, it is possible to identify an account that performs a remote operation based on a credential issued by a credential issuing device.

Furthermore, the extracted credential and the extracted identification data may be recorded while being associated with each other, and in a case where the connection is identified, the connection and the identification data may be recorded while being associated with each other, and the credential may be deleted.

By doing this, it is possible to suppress a data amount to be recorded.

Note that it is possible to create a program to cause a computer to perform processing based on the above-mentioned method, and the relevant program may be stored in a computer-readable memory medium or a memory device, such as, for example, a flexible disk, a CD-ROM, a magneto-optical disk, a semiconductor memory, or a hard disk. Note that in general, an intermediate processing result is temporarily stored in a memory device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
   first circuitry in a first computing device configured to issue a credential;
   second circuitry in a second computing device configured to perform an operation corresponding to content at a third computing device based on the credential;
   third circuitry in the third computing device configured to receive a request to perform the operation corresponding to the content from the second computing device; and
   fourth circuitry in a fourth computing device configured to monitor communication between the first computing device, the second computing device and the third computing device,
   wherein the first circuitry is configured to
   receive, from the second computing device, a first request including account information, the first request requesting issuance of the credential, generate the credential in a case where first authentication for the first request is successful, and
transmit, to the second computing device, a first response including the credential and the account information,
wherein the second circuitry is configured to
transmit, to the third computing device, a second request including the credential and not including the account information, in a case of receiving the first response from the first computing device, the second request requesting second authentication related to performing the operation corresponding to the content at the third computing device, and
transmit, to the third computing device, a third request requesting to perform the operation corresponding to the content, in a case of receiving, from the third computing device, a second response indicating a success of the second authentication,
wherein the third circuitry is configured to
receive the second request,
transmit, to the second computing device, the second response notifying success of the second authentication in a case where the second authentication for the second request succeeds,
perform the operation corresponding to the content in a case of receiving the third request, and
transmit, to the second computing device, a third response including a result of the operation corresponding to the content, and
wherein the fourth circuitry is configured to
acquire first information corresponding to the first response, second information corresponding to the second request, and third information corresponding to the third request,
generate a first log record related to issuance of the credential based on the first information,
generate a second log record related to the second authentication based on the second information and the first log record, and
generate a third log record related to the operation corresponding to the content based on the third information and the second log record.

2. The system of claim 1, wherein the fourth circuitry is configured to:
extract the credential and the account information from the first information,
generate the first log record based on the extracted credential and the account information, and
store the first log record in a memory.

3. The system of claim 2, wherein the fourth circuitry is configured to:
extract the credential from the second information,
identify the first log record by determining that the extracted credential matches the credential included in the first log record,
acquire the account information included in the identified first log record,
generate the second log including the account information and a connection identifier corresponding to transmission of the second information, and
store the second log record in the memory.

4. The system of claim 3, wherein the fourth circuitry is configured to:
extract a connection identifier from the third information,
identify the second log record by determining that the extracted connection identifier matches the connection identifier included in the second log record,
acquire the account information included in the identified second log record,
generate the third log record including the connection identifier, the account information, and command information related to the operation corresponding to the content at the third computing device, and
store the third log record in the memory.

5. The system of claim 1, wherein the first circuitry is configured to perform the first authentication based on a Kerberos authentication method.

6. The system of claim 1, wherein the second circuitry is configured to perform the second authentication in a server message block.

7. The system of claim 1, wherein the credential includes a computer identifier for identifying the second computing device and a term of validity corresponding to the credential.

8. The system of claim 1, wherein the fourth circuitry is configured to acquire the first information corresponding to the first response, the second information corresponding to the second request, and the third information corresponding to the third request by capturing packets flowing through a network to which the first computing device, the second computing device, the third computing device and the fourth computing device are connected.

9. An information processing device comprising:
a memory including instructions; and
circuitry configured to, when executing the instructions, extract, from a response transmitted from a credential issuing computing system to a client device, account information corresponding to the client device and a credential for the client device to access a server, generate a first record based on at least the account information and the credential, extract the credential from an authentication request transmitted from the client device to the server, the authentication request not including the account information, identify the first record based on a determination that the credential extracted from the authentication request matches the credential included in the first record, extract the account information from the first record based on determining that the credential extracted from the authentication request matches the credential included in the first record, generate a second record including at least the account information extracted from the first record and a connection identifier corresponding to the authentication request, extract, from an request to perform an operation on data stored at the sever transmitted by the client device, information corresponding to the operation to be performed on the data and a connection identifier corresponding to the request to perform the operation, identify the second record based on a determination that the connection identifier extracted from request to perform the operation matches the credential included in the second record, extract the account information from the second record based on determining that the connection identifier extracted from the request to perform the operation matches the connection identifier included in the second record, and generate a third record including at least the connection identifier, the account information, and the information corresponding to the operation to be performed on the data.

10. The information processing device of claim 9, wherein the circuitry is configured to monitor communications between the credential issuing computing system, the client device and the server by capturing packets flowing through a network to which the information processing device, the credential issuing computing system, the client device and the server are connected.

11. The information processing device of claim 9, wherein the connection identifier is at least one of a transmission source IP address and a transmission source port number.

12. The information processing device of claim 9, wherein the information corresponding to the operation to be performed on the data includes a command name corresponding to the operation to be performed on the data.

13. The information processing device of claim 9, wherein the information corresponding to the operation to be performed on the data includes a path name corresponding to a storage location of the data to which the operation is to be performed.

14. The information processing device of claim 9, wherein the credential is a service ticket issued by the credential issuing computing system to the client device to access the server.

15. A method performed by an information processing device, the method comprising:
  extracting, from a response transmitted from a credential issuing computing system to a client device, account information corresponding to the client device and a credential for the client device to access a server;
  generating a first record based on at least the account information and the credential;
  extracting the credential from an authentication request transmitted from the client device to the server, the authentication request not including the account information;
  identifying the first record based on a determination that the credential extracted from the authentication request matches the credential included in the first record;
  extracting the account information from the first record based on determining that the credential extracted from the authentication request matches the credential included in the first record;
  generating a second record including at least the account information extracted from the first record and a connection identifier corresponding to the authentication request;
  extracting, from an request to perform an operation on data stored at the sever transmitted by the client device, information corresponding to the operation to be performed on the data and a connection identifier corresponding to the request to perform the operation;
  identifying the second record based on a determination that the connection identifier extracted from request to perform the operation matches the credential included in the second record;
  extracting the account information from the second record based on determining that the connection identifier extracted from the request to perform the operation matches the connection identifier included in the second record; and
  generating a third record including at least the connection identifier, the account information, and the information corresponding to the operation to be performed on the data.

16. The method of claim 15, further comprising:
  monitoring communications between the credential issuing computing system, the client device and the server includes capturing packets flowing through a network to which the information processing device, the credential issuing computing system, the client device and the server are connected.

17. The method of claim 15, wherein the connection identifier is at least one of a transmission source IP address and a transmission source port number.

18. The method of claim 15, wherein the information corresponding to the operation to be performed on the data includes a command name corresponding to the operation to be performed on the data.

19. The method of claim 15, wherein the information corresponding to the operation to be performed on the data includes a path name corresponding to a storage location of the data to which the operation is to be performed.

20. The method of claim 15, wherein the credential is a service ticket issued by the credential issuing computing system to the client device to access the server.

* * * * *